(12) United States Patent
Higuchi et al.

(10) Patent No.: US 9,645,321 B2
(45) Date of Patent: May 9, 2017

(54) OPTICAL SIGNAL PROCESSING DEVICE

(71) Applicant: NIPPON TELEGRAPH AND TELEPHONE CORPORATION, Tokyo (JP)

(72) Inventors: Yuichi Higuchi, Atsugi (JP); Jo ji Yamaguchi, Atsugi (JP); Koichi Hadama, Atsugi (JP); Yuzo Ishii, Atsugi (JP); Kenya Suzuki, Atsugi (JP); Kazunori Seno, Atsugi (JP); Takeshi Kawai, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/417,709

(22) PCT Filed: Aug. 30, 2013

(86) PCT No.: PCT/JP2013/005156
§ 371 (c)(1),
(2) Date: Jan. 27, 2015

(87) PCT Pub. No.: WO2014/034144
PCT Pub. Date: Mar. 6, 2014

(65) Prior Publication Data
US 2015/0268421 A1    Sep. 24, 2015

(30) Foreign Application Priority Data

Aug. 30, 2012 (JP) .................................. 2012-190399

(51) Int. Cl.
*G02B 6/26* (2006.01)
*G02B 6/35* (2006.01)
(Continued)

(52) U.S. Cl.
CPC .......... *G02B 6/356* (2013.01); *G02B 6/12007* (2013.01); *G02B 6/2938* (2013.01); *G02B 5/02* (2013.01)

(58) Field of Classification Search
CPC .. G02B 6/356; G02B 6/12007; G02B 6/2938; G02B 5/02
(Continued)

(56) References Cited

U.S. PATENT DOCUMENTS 7,283,709 B2 * 10/2007 Doerr ................. G02B 6/12014
385/31
7,346,234 B2 * 3/2008 Davis ................. G02B 6/29311
385/15
(Continued)

FOREIGN PATENT DOCUMENTS

CN        1455275        11/2003
CN        1519594        8/2004
(Continued)

OTHER PUBLICATIONS

International Search Report in Application No. PCT/JP2013/005156 dated Oct. 1, 2013.
(Continued)

*Primary Examiner* — Ryan Lepisto
*Assistant Examiner* — Guy Anderson
(74) *Attorney, Agent, or Firm* — Workman Nydegger

(57) ABSTRACT

A wavelength selection switch can decrease the amount of increase in size and cost of a node device by integrating and sharing the constituent components of a plurality of wavelength selection switches or optical components mounted in a node. The wavelength selection switch has: at least one input port that inputs light; at least one output port that receives light from the input port; at least one light-collecting element that alters the beam shape of the light entering
(Continued)

from the input port; at least one scattering element that scatters the light entering from the input port into each wavelength; at least one wavefront control element that causes light of each wavelength scattered by the scattering element to be reflected to the output port for each wavelength.

21 Claims, 24 Drawing Sheets

(51) Int. Cl.
*G02B 6/12* (2006.01)
*G02B 6/293* (2006.01)
*G02B 5/02* (2006.01)

(58) Field of Classification Search
USPC .................................................. 385/15–19
See application file for complete search history.

(56) References Cited

U.S. PATENT DOCUMENTS

| | | | | |
|---|---|---|---|---|
| 7,352,927 B2* | 4/2008 | Davis | ................ | G02B 6/29311 359/197.1 |
| 7,362,930 B2* | 4/2008 | Davis | ................ | G02B 6/29311 359/197.1 |
| 7,539,371 B2* | 5/2009 | Martinelli | .......... | G02B 6/29311 385/16 |
| 7,912,331 B1* | 3/2011 | Yang | ...................... | G02B 6/125 385/129 |
| 8,315,490 B1* | 11/2012 | Yang | ................... | G02B 6/3518 385/17 |
| 8,606,104 B2* | 12/2013 | Yoshida | ................. | H04J 14/02 385/16 |
| 2004/0151432 A1 | 8/2004 | Tabuchi et al. | | |
| 2004/0190822 A1 | 9/2004 | Yamamoto et al. | | |
| 2006/0245685 A1 | 11/2006 | Ducellier | | |
| 2007/0081761 A1* | 4/2007 | Doerr | ................. | G02B 6/12014 385/16 |
| 2007/0160321 A1* | 7/2007 | Wu | .................... | G02B 6/12021 385/24 |
| 2009/0027749 A1* | 1/2009 | Wagener | ............. | G02B 6/3512 359/223.1 |
| 2009/0060416 A1* | 3/2009 | Yamamoto | ............. | G02B 6/356 385/24 |
| 2011/0217037 A1* | 9/2011 | Yoshida | .................. | H04J 14/02 398/48 |
| 2011/0229132 A1 | 9/2011 | Matsumoto | | |
| 2011/0292482 A1 | 12/2011 | Matsumoto | | |
| 2012/0237218 A1 | 9/2012 | Yang et al. | | |

FOREIGN PATENT DOCUMENTS

| | | |
|---|---|---|
| CN | 1762177 | 4/2006 |
| CN | 1831574 | 9/2006 |
| CN | 101051103 | 10/2007 |
| JP | 2004-239991 | 8/2004 |
| JP | 2005-070546 | 3/2005 |
| JP | 2009-122492 | 6/2009 |

OTHER PUBLICATIONS

Chao-Hsi Chi et al., "Monolithic Wavelength-Selective Switches and Cross Connects with Integrated MEMS Mirror Array," Proc. of SPIE, vol. 6376, Oct. 2006, pp. 63760G. 1-63760G. 10.
201380045794.7, Jun. 1, 2016, English Translation of Chinese Office Action.

* cited by examiner

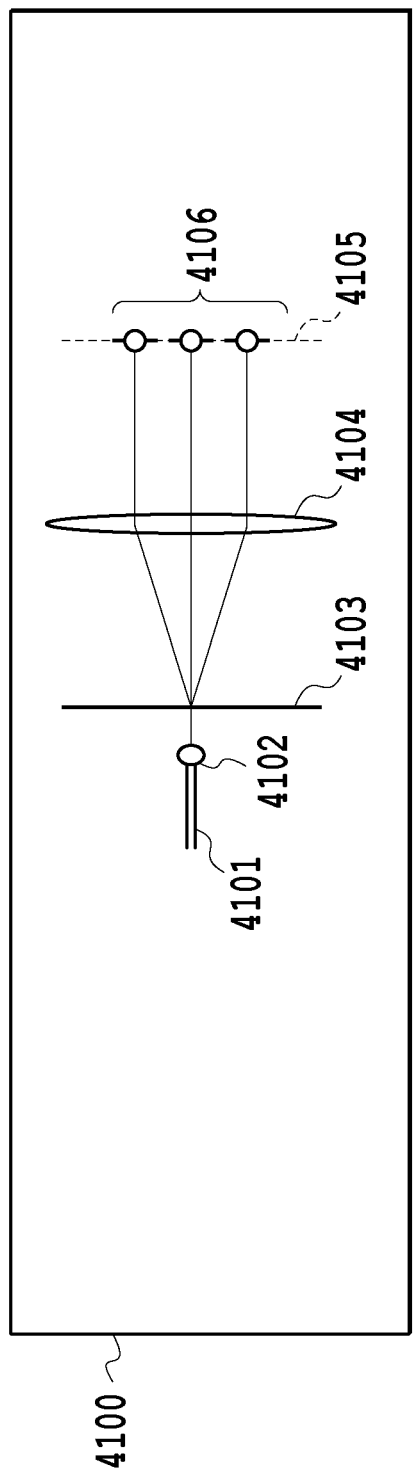

OPTICAL SIGNAL PROCESSING DEVICE

TECHNICAL FIELD

The present invention relates to an optical signal processing device.

BACKGROUND ART

In recent years, in the field of optical communications, large capacity optical transmission via a single optical fiber has been implemented by WDM (Wavelength Division Multiplexing) technology that performs transmission by multiplexing signals while allocating one signal to one wavelength. As this optical communication technology has been developed, attention has been drawn to optical switches for changing a signal path without converting an optical signal into an electric signal, etc. Among these switches, a wavelength selective switch that can select an arbitrary wavelength from several tens of wavelengths and output the wavelength to one of a plurality of output fibers (see, for example, patent literature 1) has been proposed. An example Wavelength Selective Switch (WSS) is illustrated in FIG. 1.

The wavelength selective switch in FIG. 1 includes a fiber array 001, a microlens array 002, a condenser lens 003, a cylindrical lens 004, a first main lens 005, a diffraction grating 006, a second main lens 007 and an MEMS mirror array 008, and has a configuration where these components are arranged in the order in the z direction.

The fiber array 001 is provided by arranging a plurality of optical fibers in the y direction, and is demultiplexed into an input port for emitting input light and an output port for receiving output light. In the example in FIG. 1, one input port 0011 and four output ports 0012 are provided. The microlens array 002 is arranged in the y direction in the same way as the fiber array 001, so that the individual microlenses are located opposite the corresponding optical fibers of the fiber array 001 on the output side of the input port and the input side of the output ports of the fiber array 001. The individual microlenses of the microlens array 002 shape beams that are emitted from the corresponding input and output ports of the optical fibers of the fiber array 001, and convert the beams into collimated rays.

The condenser lens 0003 concentrates light from the optical fibers to cross the principal rays at a specific point 009 (hereinafter referred to as a point A). A distance between the condenser lens 003 and the point A 009 is equal to the focal length of the condenser lens 003. The cylindrical lens 004 shapes the beam at the point A 009 into an elliptical form.

The first main lens 005, the second main lens 007 and the diffraction grating 006 constitute a 4 f optical system. The distance between the point A and the first main lens is equal to a focal length f1 of the first main lens, and the distance between the second main lens and the MEMS mirror is equal to a focal length f2 of the second main lens. Since the 4 f optical system is provided, the beam shaped at the point A 009 is projected to the MEMS mirror 008. The diameter of the beam projected to the MEMS mirror 008 is enlarged or reduced at a focal length ratio of f2/f1 relative to the beam diameter at the point A. The diffraction grating 006 serves to demultiplex, for each wavelength, signal light obtained by division multiplexing. The rays of the signal light demultiplexed for the individual wavelengths are emitted to the corresponding elements of the MEMS mirror through the second main lens 007.

The MEMS mirror 008 includes a plurality of mirror elements, which are aligned in the manner that the linear line that passes the centers of the individual mirror elements of the MEMS mirror 008 is extended in the x axial direction. The MEMS mirror 008 is arranged at the focal point of the second main lens in the state wherein the main faces of the individual mirror elements are located opposite the second main lens. The MEMS mirror 008 reflects, with an angle being changed to θx, the principal rays of the individual signal light that has been emitted, and selects output ports to which the rays enter. Since the individual mirror elements of the MEMS mirror 008 are rotated at the x axis that is perpendicular to the z axis for wavelength dispersion, the angle of incidence at the point A 009 is changed by changing the angle of emittance by the rotation. As a result, the wavelength selective switch can select the output port 0012 where the principal ray enters.

The wavelength selective switch can select the output port for each wavelength by changing the emittance angle for the MEMS mirror that is allocated for each signal light beam.

A plurality of these wavelength selective switches are mounted in a node 200 that is employed for an optical network. FIG. 2 is a structural diagram showing a wavelength selective switching unit where two wavelength selective switches (WSSes) are mounted on a single node. A wavelength selective switch 201 demultiplexes an optical signal received at the node 200 into a signal that is directed to the following wavelength selective switch 202 and a signal that is directed to receivers 203-1 and 203-2. The wavelength selective switch 202 at the succeeding stage multiplexes the signal received from the preceding wavelength selective switch 201 and the signal light received from transmitters 204-1 and 204-2, and outputs signal light from the node 200.

In the above described manner, for each node, the signals that are received and are to be transmitted, or passed through, can be demultiplexed and multiplexed by the wavelength selective switches. The node generally includes not only the wavelength selective switches, but also the other optical parts, such as an optical monitor, an optical amplifier and an optical coupler, and has functions, such as detection of a failure, compensation for the optical quality and detection of deterioration of the optical quality.

A configuration for a node employed when the number of routes is four is shown in FIG. 3. This node configuration can switch the individual signal wavelengths to arbitrary routes. At this time, eight wavelength selective switches are mounted. A case wherein the number of routes is four is employed for the description; however, an arbitrary number of routes can be employed, and as the number of routes is increased, the number of wavelength selective switches employed is also increased.

When multiple wavelength selective switches and optical parts are mounted to the node, the size of the node is increased, and the cost for the node is increased by the cost required for the number of components, such as the wavelength selective switches. Therefore, if common parts for a plurality of wavelength selective switches can be commonized and parts for which functional integration is available can be provided by using a single part, the sizes of the individual devices in the node can be reduced, and the cost can also be decreased.

In the present invention, the arrangement of input and output ports and the arrangement of an optical system, which are required for common use of parts, such as some optical parts included in a plurality of wavelength selective switches, are provided. Further, input/output port fabrication means for accurately mounting input and output ports, which will be increased by mounting a plurality of wavelength selective switches, is also provided. Furthermore, means for performing integration of the node function for the input and output ports of a wavelength selective switch is provided in order to reduce the sizes of the devices in the node.

CITATION LIST

Patent Literature

PTL 1: Japanese Patent Laid-Open No. 2009-122492

SUMMARY OF INVENTION

A wavelength selective switch array for the present invention is a wavelength selective switch array formed by mounting, on a single substrate, n wavelength selective switches, each of which includes at least one input port adapted to accept light, at least one output port adapted to receive light from the input port, at least one condenser element adapted to change a shape of a beam of light received from the input port, at least one dispersive element adapted to demultiplex, for each wavelength, the light received from the input port, and at least one wavefront control element adapted to permit the light demultiplexed by the dispersive element for each wavelength to be reflected to the output port according to each wavelength, and at least one of the condenser element, the dispersive element and the wavefront control element can be employed in common by the n wavelength selective switches.

Further, at least the condenser element can be employed in common by the n wavelength selective switch of the present invention.

Furthermore, according to the wavelength selective switch array of the present invention, for the wavelength selective switches that belong to the same group, principal rays for individual wavelengths of light entering and exiting the input port and the output port intersect at one point on the wavefront control element, and for the wavelength selective switches that belong to different groups, do not intersect on the wavefront control element.

Moreover, according to the wavelength selective switch array of the present invention, for the wavelength selective switches that belong to the same group, the input port and the output port are arranged on an arc by employing, as the center, one point on the wavefront control element, and for the wavelength selective switches that belong to different groups, the input port and the output port are arranged on different arcs by employing, as the center, different points on the wavefront control element.

Further, for the wavelength selective switch array of the present invention, angles of the principal rays entering and exiting the input port and the output port are varied among the wavelength selective switches that belong to different groups.

Furthermore, according to the wavelength selective switch array of the present invention, for the wavelength selective switches that belong to the same group, the input port and the output port are arranged so that angles of incidence and angles of emittance of the principal rays are parallel to each other, and for the wavelength selective switches that belong to different groups, the input port and the output port are arranged so that the angles of incidence and the angles of emittance of the principal rays are not parallel.

Moreover, according to the wavelength selective switch array of the present invention, for the wavelength selective switches that belong to the same group, the principal rays for the individual wavelengths of light entering and exiting the input port and the output port intersect at one point located outside the wavefront control element, and the point located outside the wavefront control element is different for the wavelength selective switches that belong to different groups.

Further, for the wavelength selective switch array of the present invention, the input port and the output port are arranged so that, in the wavelength selective switches that belong to the same group, the angles of incidence and the angles of emittance of the principal rays are different.

Furthermore, according to the wavelength selective switch array of the present invention, for the wavelength selective switches that belong to the same group, the input port and the output port are arranged, so that the angles of incidence and the angles of emittance of the principal rays are parallel, and the principal rays intersect at one point by at least one lens, and for the wavelength selective switches that belong to different groups, the input port and the output port are arranged, so that the angles of incidence and the angles of emittance for the principal rays are not parallel.

Moreover, for the wavelength selective switch array of the present invention, either set of the input port and the output port, or of the input port, the output port, and at least one of the condenser element, the dispersive element and the wavefront control element can be produced by using a planar lightwave circuit.

Since common use and integration of the components, such as a plurality of wavelength selective switches and optical parts, mounted to a node is promoted, the size of the node device and the additional increase of the cost can be reduced.

BRIEF DESCRIPTION OF DRAWINGS

FIG. 4A A diagram illustrating a first embodiment for a wavelength selective switch according to the present invention;

DESCRIPTION OF EMBODIMENTS

The embodiments of the present invention will now be described; however, the present invention is not limited to these embodiments. It should be noted that the symbols and numbers employed for all the drawings denote the identical or corresponding portions.

[First Embodiment]

Figure 1:
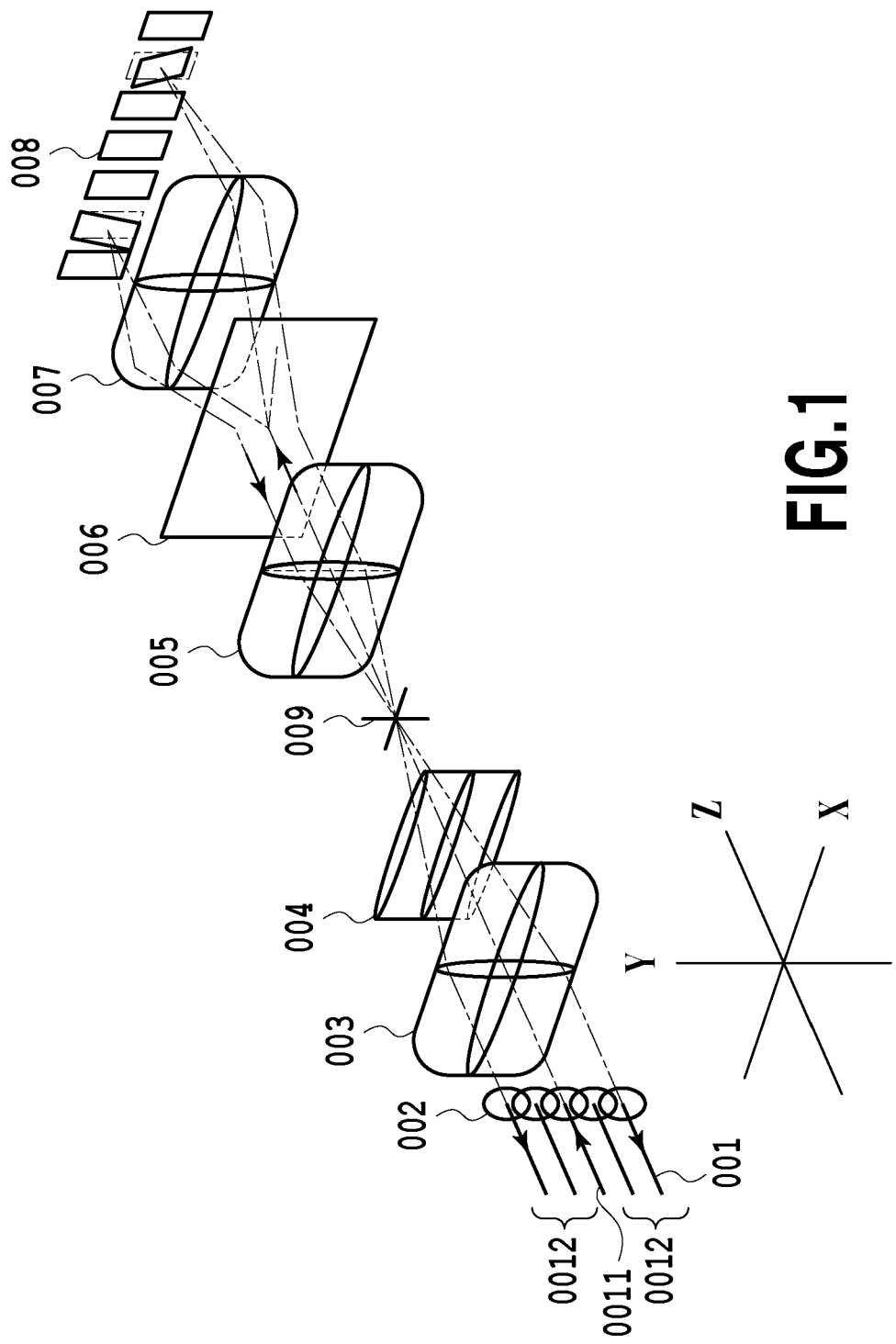
FIG. 1 A diagram illustrating an example conventional wavelength selective switch described in patent literature 1.
Figure 2:
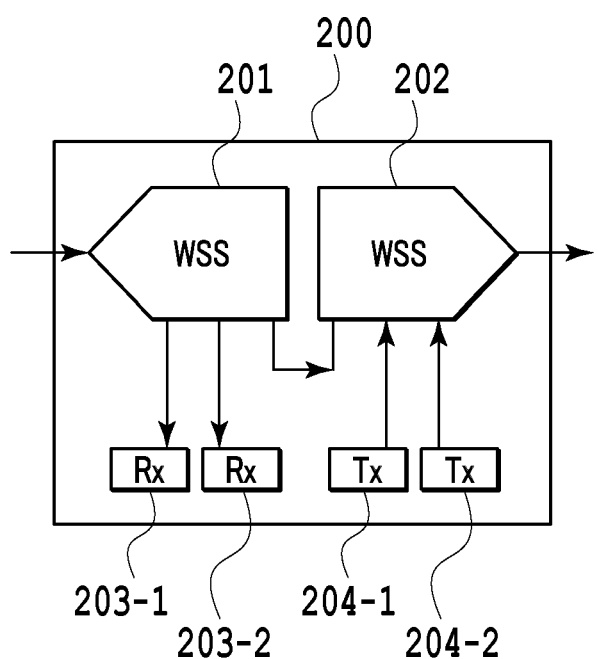
FIG. 2 A diagram illustrating a node where two of the wavelength selective switches described in patent literature 1 are mounted.
Figure 3:
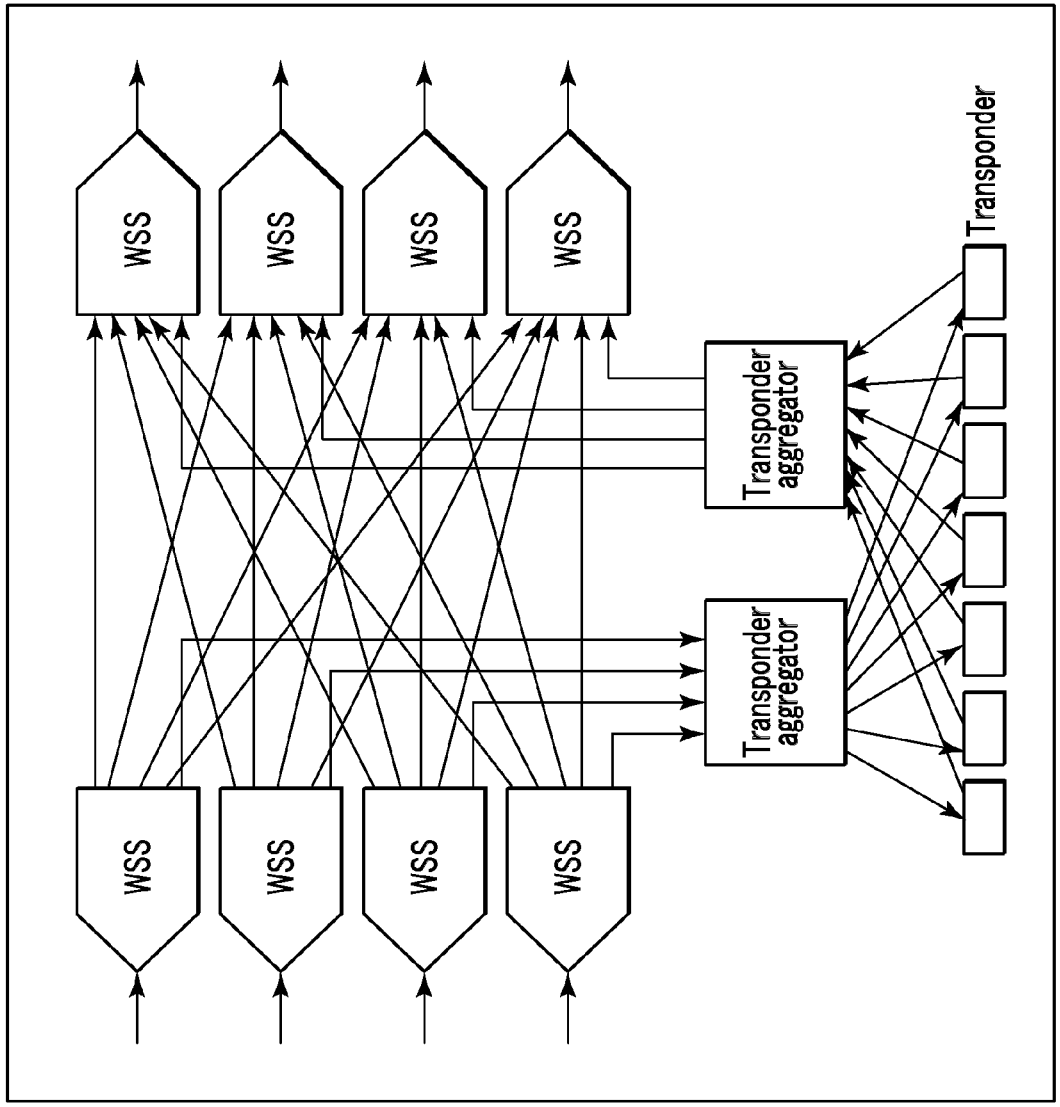
FIG. 3 A diagram illustrating a node for which the number of routes of the wavelength selective switch described in patent literature 1 is four.
Figure 4B:
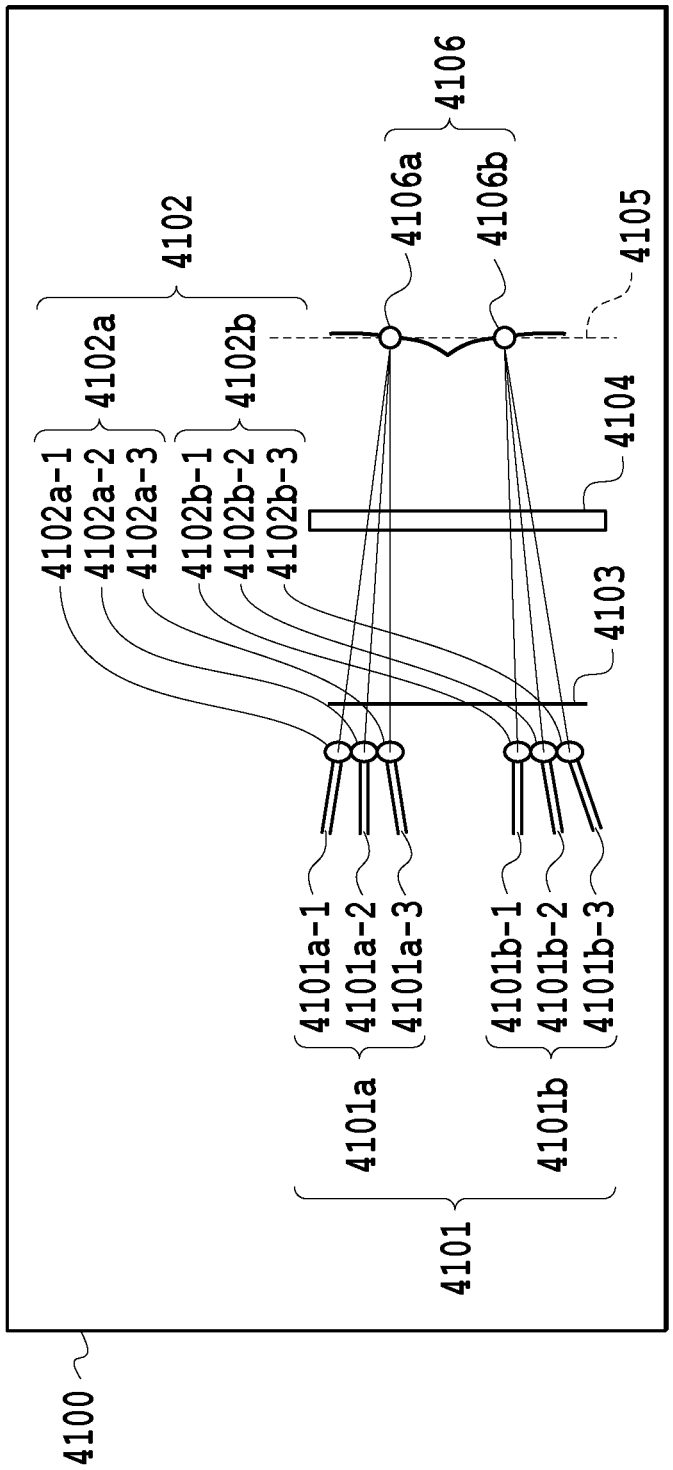
FIG. 4B A diagram illustrating the first embodiment for the wavelength selective switch according to the present invention.

A wavelength selective switch array 4100 for a first embodiment is shown in FIGS. 4A and 4B. The wavelength selective switch array 4100 in FIGS. 4A and 4B includes input/output port arrays 4101, microlens arrays 4102, a dispersive element 4103, a condenser lens 4104 and a reflective wavefront control element 4105. The wavelength selective switch array of the present invention includes a plurality of input/output port arrays, and a plurality of input and output ports are provided in the individual input/output port arrays.

A direction in which the ports are aligned is defined as a port direction. FIG. 4A is a cross-sectional view of the wavelength selective switch array taken in a wavelength dispersion direction that is perpendicular to the port direction, and FIG. 4B is a cross-sectional view of the wavelength selective switch array taken in the port direction.

(Components of Optical System)

The input/output port arrays 4101 are formed by aligning a plurality of optical fibers in a row, and are separated into input ports for emitting input light, and output ports for receiving the output light. In the examples in FIGS. 4A and 4B, two input/output port arrays, i.e., a first input/output port array 4101a and a second input/output port array 4101b, are prepared. The first input/output port array 4101a includes an input port 4101a-1 and two output ports 4101a-2 and -3. In contrast, the second input/output port array 4101b includes an input port 4101b-1 and two output ports 4101b-2 and -3. The microlens arrays 4102 are arranged in the same direction as the input/output port arrays 4101, so that the individual microlenses are located, on the output side of the input ports and on the input side of the output ports of the input/output port arrays 4101, opposite the corresponding optical fibers of the input/output port arrays 4101. The individual microlenses of the microlens arrays 4102 adjust the shapes of the beams that are emitted from the input and output ports 4101a-1 to 4101a-3 and 4101b-1 to 4101b-3, which correspond to the optical fibers of the fiber arrays, and convert the beams into collimated light.

The dispersive element 4103 demultiplexes, by wavelengths, the light emitted from the individual input ports 4101a-1 and 4101b-1 of the input/output port arrays 4101, and projects the demultiplexed light to the wavefront control element 4105 through the condenser lens 4104. An example for the dispersive element 4103 is a diffraction grating, but the dispersive element is not limited to this component.

The condenser lens 4104 is a cylindrical lens, and provides the effect for changing the shape of a beam to be projected to the wavefront control element 4105. When the diameter of a beam projected to the wavefront control element 4105 in the wavelength demultiplexing direction is reduced, the passband for signal light can be wider.

The reflective wavefront control element 4105 reflects the individual irradiated principal rays, while changing the angle of emittance by performing the wavefront control, and selects the output ports on which the principal rays are made incident. The wavefront control elements 4105 for the individual wavelength selective switches are aligned, in the wavelength dispersion direction, relative to the input/output port arrays, and are mounted on at least one substrate. Since the locations of irradiation of the principal rays to the dispersive control element 4105 differ for the wavelengths of the light demultiplexed by the dispersive element 4103, a plurality of the wavefront control elements 4105 provided for the substrate can independently change the angle of emittance, and when the angle of emittance is changed, the output port 4101a-2 or 4101a-3, or 4101b-2 or 4101b-3, can be selected for each wavelength.

The wavefront control element 4105 has a reflective face, and is arranged in the state wherein the reflective face is opposite the condenser lens. The reflective face of the reflective wavefront control element 4105 is supported in the state wherein rotation is enabled in a direction perpendicular to the axis in the wavelength dispersion direction, i.e., around the axis in the wavelength dispersion direction. Since the angle of emittance is changed by rotation, the output port on which the principal ray is made incident (4101a-2 or -3 or 4101b-2 or -3) can be selected. In this case, the light beams entering the wavefront control element 4105 is not limited to parallel beams, and may be focused beams or divergent beams.

As the reflective wavefront control element 4015, LCOS (Liquid Crystal on Silicon), an MEMS (Micro-Electro-Mechanical Systems) mirror, a liquid crystal panel or a DMD (Digital Micromirror Device), for example, can be employed.

(Port Switching)

When the light is emitted from the port 4101a-1 of the first input/output port array 4101a, the light is transmitted through the corresponding microlens 4102a-1 of the first microlens array 4102a, the dispersive element 4103 and the condenser lens 4104, and is projected to the reflective wavefront control element 4105. The light projected to the wavefront control element 4105 is reflected to change the emittance angle through the wavefront control, and the reflected light is transmitted again through the condenser lens 4104 and the dispersive element 4103, and through the microlens 4102a-2 of the first microlens array 4102a, and is coupled at the port 4101a-2 of the first input/output port array 4101a. When the wavefront control element 4105 is appropriately controlled, the direction of the reflected light can be changed, and the reflected light can also be coupled at another port 4101a-3. The output port for coupling may be the same port, i.e., the input port 4101a-1, and in this case, the output light is demultiplexed by additionally providing a circulator. Since the optical system is designed so that the principal rays of a beam that enter or exit, according to the wavelengths, the same input/output port array, i.e., the first input/output port array 4101a, intersect at the identical point 4106a on the wavefront control element 4105, high coupling efficiency can be obtained.

The similar port switching operation is performed for the second input/output port array 4101b. Specifically, light emitted from the port 4101b-1 of the second input/output port array 4101b is transmitted through the corresponding microlens 4102b-1 of the second microlens array 4102b, the dispersive element 4103 and the condenser lens 4104, and is projected to the wavefront control element 4105. The light projected to the wavefront control element 4105 is reflected to change the angle of emittance through wavefront control, and the reflected light is transmitted again through the condenser lens 4104 and the dispersive element 4103 and through the microlens 4102b-2 of the second microlens array 4102b, and is coupled at the port 4101b-2 of the second input/output port array 4101b. When the wavefront control element 4105 is appropriately controlled, the direction of the reflected light can be changed, and can also be coupled at another port 4101b-3. As well as the case of the first input/output port array, the optical system is designed so that the principal rays of a beam that enter or exit the same input/output port array, i.e., the second input/output port array 4101b, according to the wavelengths intersect at the identical point 4106b on the wavefront control element 4105.

Here, the focal point 4106b associated with the second input/output port array 4101b is provided at a different location from that for the focal point 4106a associated with the first input/output port array 4101a. In order to provide different locations, in this embodiment, the fibers connected to the first input/output port array 4101a are arranged on the arc with the point 4106a being the center, while the fibers connected to the second input/output port array 4101a are arranged on the arc with the point 4106b being the center.

When the electric field profile on the wavefront control element 4105 for a beam of light emitted from the input port is represented by $E_0$, the electric field profile for a beam of light emitted from an arbitrary output port is represented by $E_1$, and a phase to be corrected by the wavefront control element is represented by H, coupling efficiency η can be represented by $$\eta = \frac{\int E_0 E_1^* H ds \int E_0^* \cdot E_1 H ds}{\int E_0 E_0^* ds \int E_1 E_1^* ds} \quad \text{[Expression 1]}$$

Here, s denotes the dimension of the face of the wavefront control element 4105. The electric field profiles for the beams of light emitted from the input and output ports of the input/output port arrays 4101 are in the same Gaussian shape. When the intensity distributions for the beam profiles emitted from the input and output ports can be obtained near each other, and the phases of the beam profiles of light emitted from the input and output ports can be matched according to the phase H of the wavefront control element, the coupling efficiency is increased. Therefore, as for coupling of the light at the ports that belong to the identical wavelength selective switch to be connected, when the configuration is so designed that the intensity distributions of the beam profiles can be provided near each other, and the phases of the beam profiles for arbitrary output and input ports can be matched by the wavefront control element, the coupling efficiency can be selectively increased by the wavefront control element. In contrast, as for coupling at the ports that belong to a different wavelength selective switch, the configuration is designed not to provide the intensity distributions of the beam profiles adjacent to each other, and the occurrence of crosstalk can be suppressed.

(Input/Output Ports of PLC)

Figure 5:
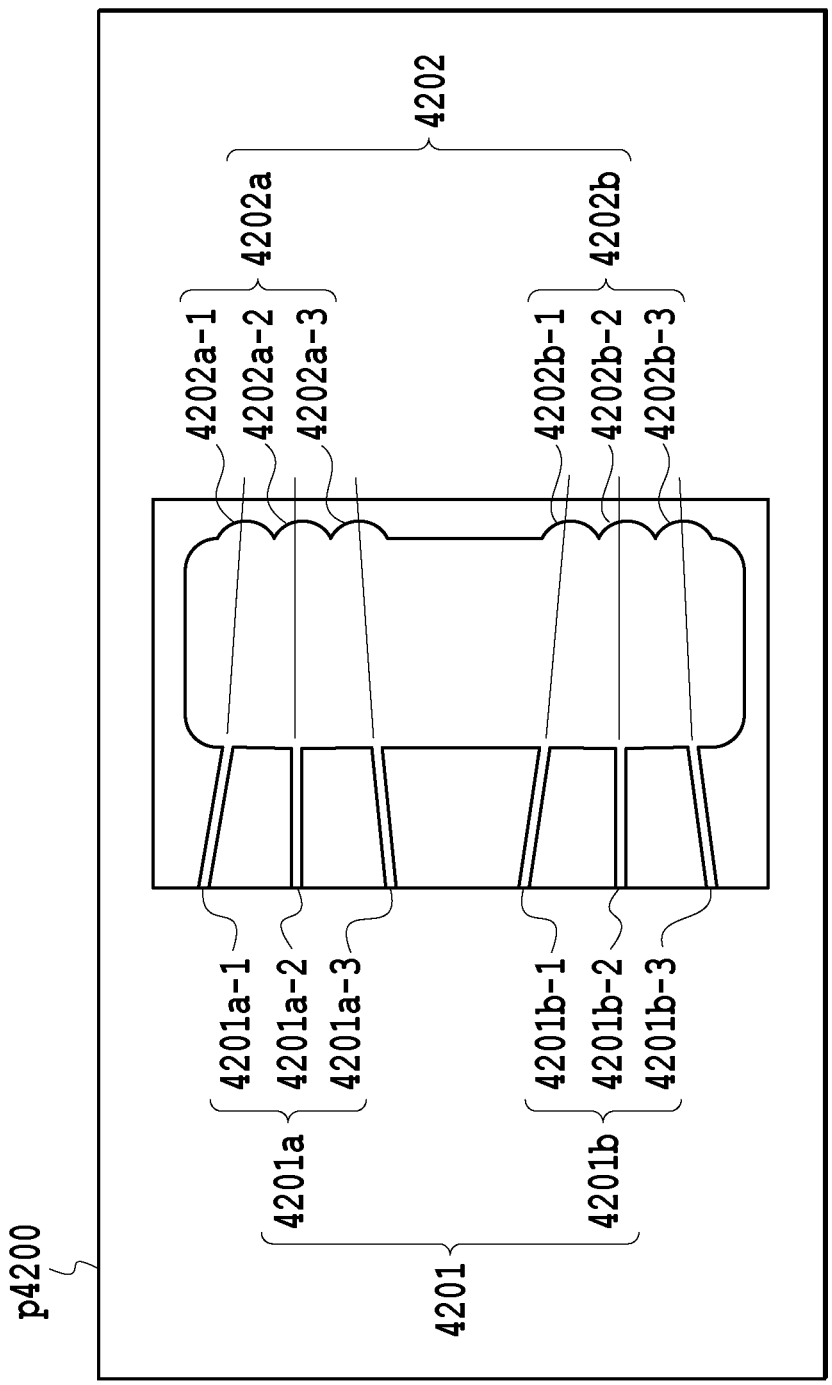
FIG. 5 A diagram showing an example wherein an input port array and a microlens array for the first embodiment of the wavelength selective switch according to the present invention are integrated on a PLC.

Since the node where the wavelength selective switch array according to the present invention is arranged includes a plurality of (two in this embodiment) wavelength selective switches, a plurality of input/output port arrays and microlens arrays are at least provided. Therefore, a high-density arrangement is necessary for compact packaging, and high implementation accuracy is required. Thus, as shown in FIG. 5, the input/output port arrays and the microlens arrays are fabricated by being integrated on a Planar Lightwave Circuit (PLC) employing the photolithography technology, and thus, the accurate arrangement that is consonant with high mask overlay accuracy can be obtained. Referring to FIG. 5, input/output port arrays 4201 and microlens arrays 4202 are employed. The input/output port arrays 4201 correspond to the input/output port arrays 4101 in FIG. 5, and the microlens arrays 4202 correspond to the microlens arrays 4102. Light emitted from one port 4201a-1 of a first input/output port array 4201a is transmitted through a corresponding microlens 4202a-1 of a first microlens array 4202a, and is emitted to the following optical system beginning with the dispersive element 4103 shown in FIGS. 4A and 4B. Light returned from the dispersive element 4103 is transmitted through a microlens 4202a-2 of the first microlens array 4202a, and is coupled at a port 4201a-2 of the first input/output port array 4201a. When the wavefront control element 4105 is appropriately controlled in the same manner as in FIGS. 4A and 4B, the direction of reflected light can be changed, and can also be coupled at another port 4201a-3. The same port switching operation is performed for a second input/output port array 4201b. The arrangement where the input/output port arrays 4201 and the microlens arrays 4202 are produced by employing a PLC has been described by referring to FIG. 5, in the same manner by referring to FIGS. 4A and 4B. However, only the input/output port arrays (4101*a* and 4101*b*) may be produced by employing a PLC, or some optical parts except for the wavefront control element 4105 may be integrated on the PLC.

Further, the input and output ports and the microlens array may be integrated on a PLC for each of the input/output port arrays, and a number of PLCs equivalent to the number of wavelength selective switches may also be prepared. The PLC substrates for the individual wavelength selective switches may be arranged in parallel to each other, or may be arranged at appropriate angles to each other. When this three-dimensional arrangement is employed, it is easy that the number of ports is increased while the port density is increased for compact packaging.

The other functional elements, such as an optical splitter, an optical combiner, a switch, a light receiving element and a grating, can also be integrated on the PLC. With this arrangement, addition of the functions to the wavelength selective switch is enabled, and when an optical tap (splitter) and optical monitors (a grating and a light receiving element), for example, are integrated, the function for detecting a failure of the wavelength selective switch can be additionally provided.

According to this optical system, when the focal points of the principal rays are changed depending on the individual wavelength selective switches of the input/output port arrays 4101, and the ports are arranged along the arc with the focal point being the center, a plurality of groups of switches can be provided with a simple structure. Further, a plurality of wavelength selective switches can be obtained by additionally providing the dispersive element 4103. Furthermore, since the ports can be fabricated by using a planar lightwave circuit, a mounting error can be reduced, and the additional function can easily be mounted.

In this embodiment, the fibers are employed as the ports; however, both the fibers and the microlens array may also be employed together as ports.

[Second Embodiment]

Figure 6A:
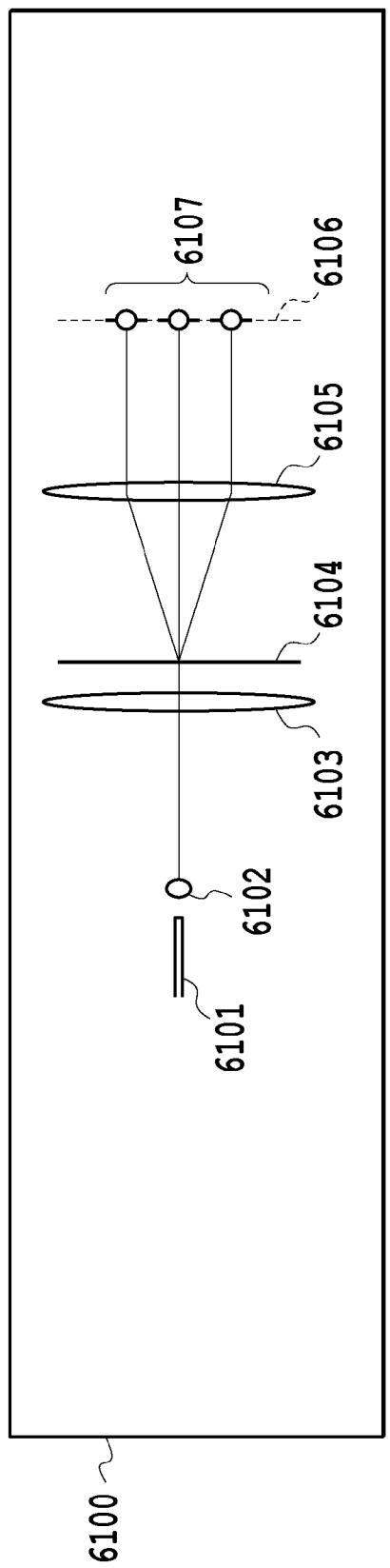
FIG. 6A A diagram illustrating a second embodiment for the wavelength selective switch according to the present invention.
Figure 6B:
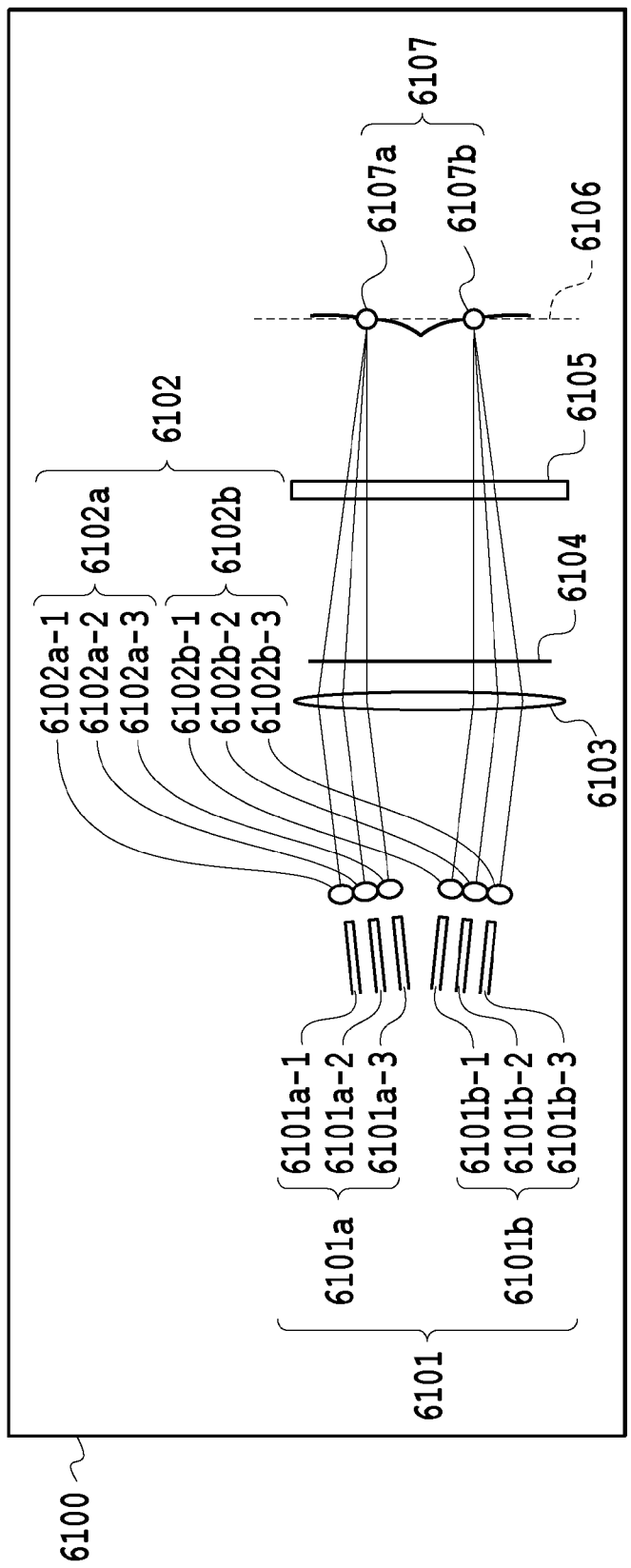
FIG. 6B A diagram illustrating the second embodiment for the wavelength selective switch according to the present invention.

A wavelength selective switch array 6100 for a second embodiment is shown in FIGS. 6A and 6B. Referring to FIGS. 6A and 6B, the arrangement includes input/output port arrays 6101, microlens arrays 6102, a condenser lens 6103, a dispersive element 6104, a cylindrical lens 6105 and a reflective wavefront control element 6106. The wavelength selective switch array of the present invention includes a plurality of input/output port arrays, and a plurality of input and output ports are provided in the individual input/output port arrays. For the wavelength selective switch array 6100 in this embodiment, two wavelength selective switches are mounted on the same substrate.

A direction in which the ports are aligned is defined as a port direction. FIG. 6A is a cross-sectional view of the wavelength selective switch array taken in a wavelength dispersion direction that is perpendicular to the port direction, and FIG. 6B is a cross-sectional view of the wavelength selective switch array taken in the port direction.

(Components of Optical System)

The input/output port arrays 6101 are identical to the input/output port arrays 4101 shown in FIGS. 4A and 4B for the first embodiment, and the microlens arrays 6102 are identical to the microlens arrays 4102, except for the arrangement method employed. Further, the reflective wavefront control element 6106 is identical to the reflective wavefront control element 4105.

The dispersive element 6104 demultiplexes, by wavelengths, the light emitted from the individual input ports 6101*a*-1 and 6101*b*-1 of the input/output port arrays 6101, and projects the demultiplexed light to the wavefront control element 6106 through the cylindrical lens 6105.

The condenser lens 6103 and the cylindrical lens 6105 provide the effect for changing the shape of a beam to be projected to the wavefront control element. When the diameter of a beam projected to the wavefront control element in the wavelength demultiplexing direction is reduced, the passband for signal light can be extended. Further, when the size of the beam is enlarged in the port switching direction, the angle of emittance required for switching can be reduced.

(Port Switching)

When the light is emitted from the port 6101*a*-1 of the first input/output port array 6101*a*, the light is transmitted through the corresponding microlens 6102*a*-1 of the first microlens array 6102*a*, the condenser lens 6103, the dispersive element 6104 and the cylindrical lens 6105, and is projected to the reflective wavefront control element 6106. The light projected to the wavefront control element 6106 is reflected to change the emittance angle through the wavefront control, and the reflected light is transmitted again through the cylindrical lens 6105, the dispersive element 6104 and the condenser lens 6103 and through the microlens 6102*a*-2 of the first microlens array 6102*a*, and is coupled at the port 6101*a*-2 of the first input/output port array 6101*a*. When the wavefront control element 6106 is appropriately controlled, the direction of the reflected light can be changed, and the reflected light can also be coupled at another port 6101*a*-3. The condenser lens 6103 has a function whereby light rays having arbitrary angles, which intersect at an identical point 6107*a* on the wavefront control element, become parallel to each other on the face of the input/output port, and the ports that belong to the same switch group are arranged in parallel to each other. The input port 6101*a*-1 may also be employed as an output port for coupling, and in this case, the output light is demultiplexed by additionally providing a circulator. Since the optical system is designed so that the principal rays of a beam that enter or exit, according to wavelengths, a single input/output port array, i.e., the first input/output port array 6101*a*, intersect at the identical point 6107*a* on the wavefront control element 6106, high coupling efficiency can be obtained.

The similar port switching operation is performed for the second input/output port array 6101*b*. Specifically, light emitted from the port 6101*b*-1 of the second input/output port array 6101*b* is transmitted through the corresponding microlens 6102*b*-1 of the second microlens array 6102*b*, the condenser lens 6103, the dispersive element 6104 and the cylindrical lens 6105, and is projected to the wavefront control element 6106. The light projected to the wavefront control element 6106 is reflected to change the angle of emittance through wavefront control, and the reflected light is transmitted again through the cylindrical lens 6105, the dispersive element 6104 and the condenser lens 6103 and through the microlens 6102*b*-2 of the second microlens array 6102*b*, and is coupled at the port 6101*b*-2 of the second input/output port array 6101*b*. When the wavefront control element 6106 is appropriately controlled, the direction of the reflected light can be changed, and can also be coupled at another port 6101*b*-3. As well as the case of the first input/output port array, the optical system is designed so that the principal rays of a beam that enter or exit, according to wavelength, the same input/output port array, i.e., the first input/output port array 6101*b*, intersect at the identical point 6107*b* on the wavefront control element 6106.

In this embodiment, the coupling efficiency is also improved when overlap between the input and output beams is increased, and the phases of the beams are aligned with each other. That is, as for coupling of the beams at the ports that belong to the same switch group to be connected, the coupling efficiency can be selectively improved by designing the arrangement to obtain overlap between the beams and to align the phases of the beams. As for coupling of the beams at the ports that belong to different switch groups, the occurrence of crosstalk can be reduced by designing the arrangement not to obtain overlap between the beams.

Further, in this embodiment, when the input/output port arrays and the microlens arrays are provided by being integrated on a planer lightwave circuit by using the photolithography technology, the accurate arrangement consonant with high mask overlay accuracy can be implemented.

According to this optical system, since the angles of incidence and the angles of emittance of the principal rays are changed depending on the individual wavelength selective switches of the input/output port arrays 6101, and the fibers connected to the input/output ports of the individual wavelength selective switches are arranged in parallel to each other, a plurality of wavelength selective switches can be provided with a simple structure. Further, a plurality of wavelength selective switches can be obtained by additionally providing the dispersive element 6104. Furthermore, since the ports can be fabricated by using a planar lightwave circuit, a mounting error can be reduced, and the additional function can easily be mounted.

[Third Embodiment]

Figure 7A:
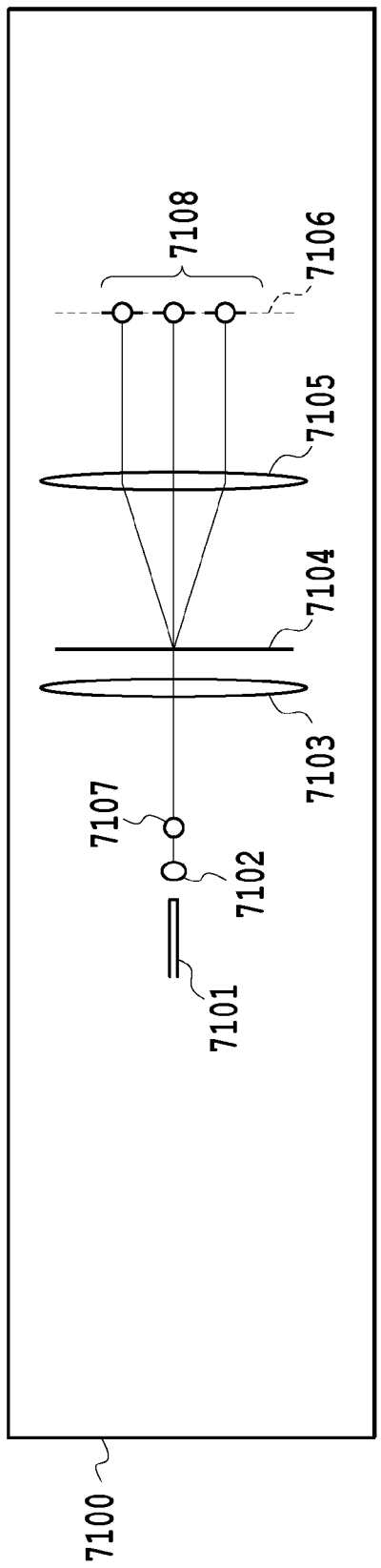
FIG. 7A A diagram illustrating a third embodiment for the wavelength selective switch according to the present invention.
Figure 7B:
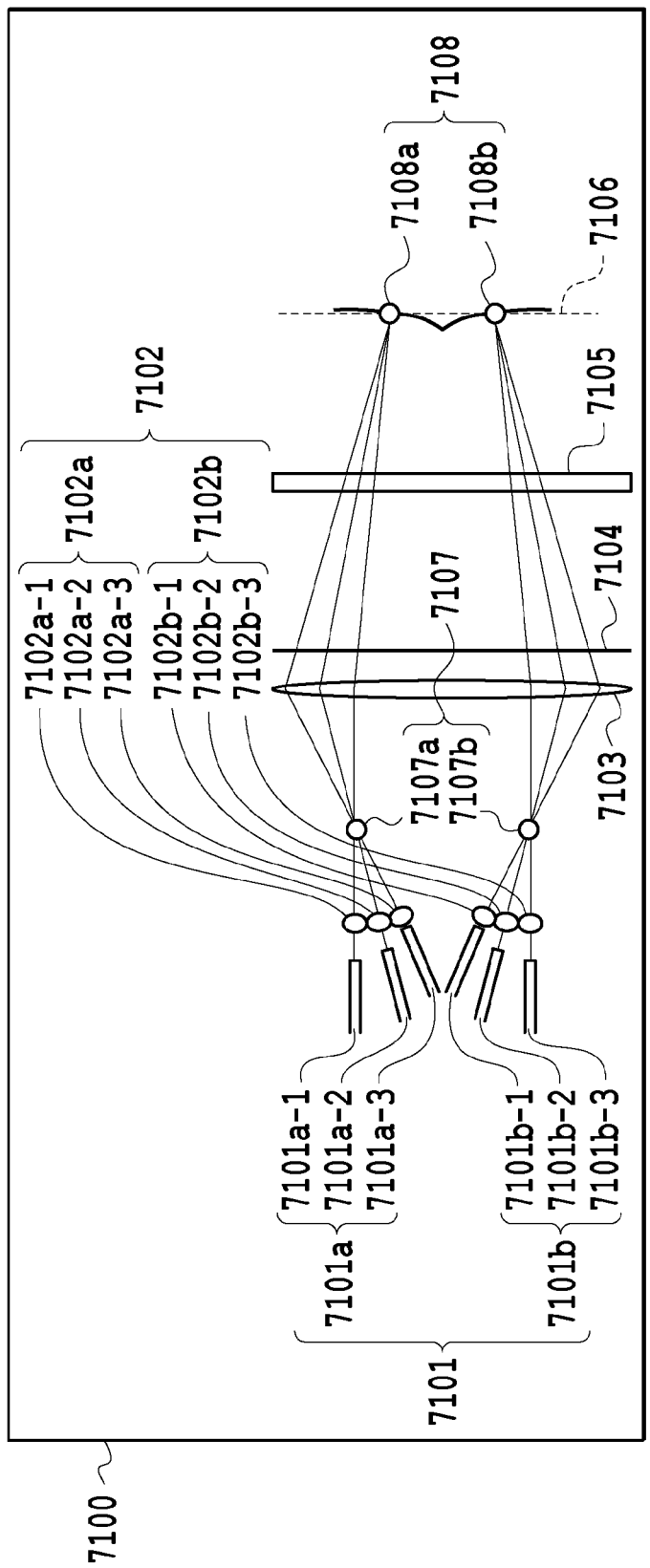
FIG. 7B A diagram illustrating the third embodiment for the wavelength selective switch according to the present invention.

A wavelength selective switch array 7100 for a third embodiment is shown in FIGS. 7A and 7B. Referring to FIGS. 7A and 7B, the arrangement includes input/output port arrays 7101, microlens arrays 7102, a condenser lens 7103, a dispersive element 7104, a cylindrical lens 7105 and a reflective wavefront control element 7106. The wavelength selective switch array of the present invention includes a plurality of input/output arrays, and a plurality of input and output ports are provided in the individual input/output port arrays.

A direction in which the ports are aligned is defined as a port direction. FIG. 7A is a cross-sectional view taken in a wavelength dispersion direction that is perpendicular to the port direction, and FIG. 7B is a cross-sectional view taken in the port direction.

(Components of Optical System)

The input/output port arrays 7101 are identical to the input/output port arrays 4101 shown in FIGS. 4A and 4B for the first embodiment, and the microlens arrays 7102 are identical to the microlens arrays 4102, except for the arrangement method employed. Further, the reflective wavefront control element 7106 is identical to the reflective wavefront control element 4105.

The dispersive element 7104 demultiplexes, by wavelengths, the light emitted through the condenser lens 7103 from the individual input ports 7101a-1 and 7101b-1 of the input/output port arrays 7101, and projects the demultiplexed light to the wavefront control element 7106 through the cylindrical lens 7105.

The condenser lens 7103 and the cylindrical lens 7105 provide the effect for changing the shape of a beam to be projected to the wavefront control element 7106. When the diameter of a beam projected to the wavefront control element 7106 in the wavelength demultiplexing direction is reduced, the passband for signal light can be extended. Further, when the size of the beam is enlarged in the port switching direction, the angle of emittance required for switching can be reduced.

(Port Switching)

When the light is emitted from the port 7101a-1 of the first input/output port array 7101a, the light is transmitted through the corresponding microlens 7102a-1 of the first microlens array 7102a, the condenser lens 7103, the dispersive element 7104 and the cylindrical lens 7105, and is projected to the reflective wavefront control element 7106. The light projected to the wavefront control element 7106 is reflected to change the emittance angle through the wavefront control, and the reflected light is transmitted again through the cylindrical lens 7105, the dispersive element 7104 and the condenser lens 7103 and through the microlens 7102a-2 of the first microlens array 7102a, and is coupled at the port 7101a-2 of the first input/output port array 7101a. When the wavefront control element 7106 is appropriately controlled, the direction of the reflected light can be changed, and the reflected light can also be coupled at another port 7101a-3. The condenser lens 7103 has a function that crosses, at a point 7107a on a face other than that of the wavefront control element, light rays having arbitrary angles that intersect at an identical point 7108a on the wavefront control element, and the input/output port 7101a of the same input/output port array, i.e., the first input/output port array 7101a, is located on the arc with the point 7107a being the center. The point 7101a may also be provided as a virtual point located on the line of extension of the principal ray. Since the optical system is designed so that the principal rays of a beam that enter or exit, according to wavelengths, the same input/output port array, i.e., the first input/output port array 7101a, intersect at the identical point 7106a on the wavefront control element 7106, high coupling efficiency can be obtained.

The similar port switching operation is performed for the second input/output port array 7101b. Specifically, light emitted from the port 7101b-1 of the second input/output port array 7101b is transmitted through the corresponding microlens 7102b-1 of the second microlens array 7102b, the condenser lens 7103, the dispersive element 7104 and the cylindrical lens 7105, and is projected to the wavefront control element 7106. The light projected to the wavefront control element 7106 is reflected to change the angle of emittance through wavefront control, and the reflected light is transmitted again through the cylindrical lens 7105, the dispersive element 7104 and the condenser lens 7103 and through the microlens 7102b-2 of the second microlens array 7102b, and is coupled at the port 7101b-2 of the second input/output port array 7101b. When the wavefront control element 7106 is appropriately controlled, the direction of the reflected light can be changed, and can also be coupled at another port 7101b-3. As well as the case of the first input/output port array, the optical system is designed so that the principal rays of a beam that enter or exit, according to wavelength, the same input/output port array, i.e., the second input/output port array 7101b, intersect at the identical point 7108b on the wavefront control element 7106, and also intersect at the identical point 7107b on a face outside the wavefront control element.

In this embodiment, the fibers connected to the first input/output port array 7101a are arranged on the arc with the point 7107a being the center, while the fibers connected to the second input/output port array 7101b are arranged on the arc with the point 7107b being the center, and the focal point 7107a and the focal point 7107b are arranged at different locations. With this arrangement, as for coupling of the beams at the ports that belong to the same wavelength selective switch to be connected, the coupling efficiency can be selectively improved by designing the arrangement to obtain overlap between the beams and to align the phases of the beams. As for coupling of the beams at the ports that belong to different wavelength selective switches, the occurrence of crosstalk can be reduced by designing the arrangement not to obtain overlap between the beams.

Further, in this embodiment, when the input/output port arrays and the microlens arrays are provided by being integrated on a planer lightwave circuit by using the photolithography technology, the accurate arrangement consonant with high mask overlay accuracy can be implemented.

According to this optical system, since the focal points of the principal rays are changed depending on the individual wavelength selective switches of the input/output port arrays 7101, and since the ports are arranged along the arc with the focal point 7107 being the center, and the point 7107 is projected to the wavefront control element 7106 by the condenser lens, a plurality of groups of switches can be provided with a simple structure. Further, a plurality of wavelength selective switches can be obtained by additionally providing the dispersive element 7104. Furthermore, since the ports can be fabricated by using a planar lightwave circuit, a mounting error can be reduced, and the additional function can easily be mounted.

[Fourth Embodiment]

Figure 8A:
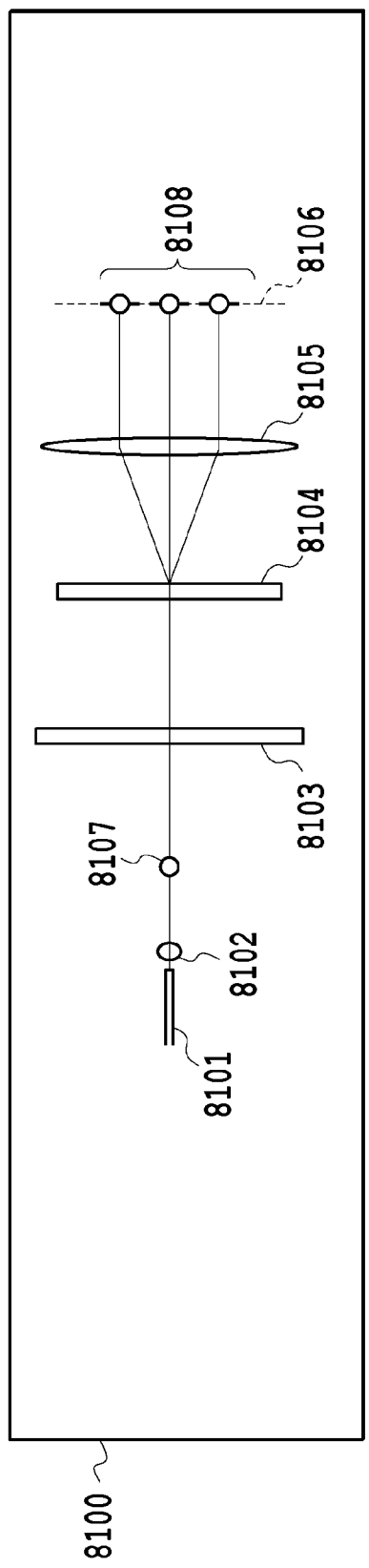
FIG. 8A A diagram illustrating a fourth embodiment for the wavelength selective switch according to the present invention.
Figure 8B:
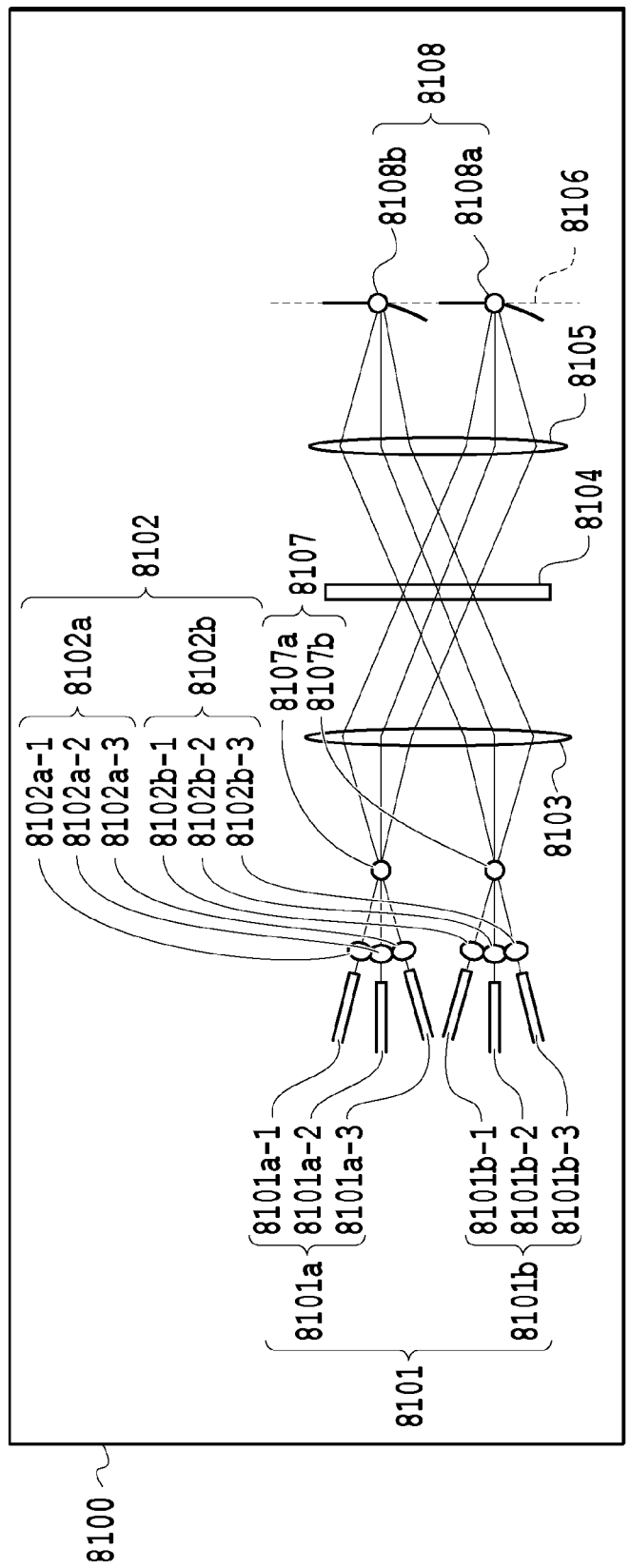
FIG. 8B A diagram illustrating the fourth embodiment for the wavelength selective switch according to the present invention.

A wavelength selective switch array 8100 for a fourth embodiment is shown in FIGS. 8A and 8B. Referring to FIGS. 8A and 8B, the arrangement includes input/output port arrays 8101, microlens arrays 8102, a cylindrical lens 8103, a dispersive element 8104, a condenser lens 8105 and a reflective wavefront control element 8106. A plurality of input/output ports are arranged for the individual arrays, and in this embodiment, three input and output ports are provided in each array.

A direction in which the ports are aligned is defined as a port direction. FIG. 8A is a cross-sectional view taken in a wavelength dispersion direction that is perpendicular to the port direction, and FIG. 8B is a cross-sectional view taken in the port direction.

(Components of Optical System)

The input/output port arrays 8101 are identical to the input/output port arrays 4101 shown in FIGS. 4A and 4B for the first embodiment, and the microlens arrays 8102 are identical to the microlens arrays 4102, except for the arrangement method employed. Further, the reflective wavefront control element 8106 is identical to the reflective wavefront control element 4105.

The dispersive element 8104 demultiplexes, by wavelengths, the light emitted through the cylindrical lens 8103 from the individual input ports 8101*a*-1 and 8101*b*-1 of the input/output port arrays 8101, and projects the demultiplexed light to the wavefront control element 8106 through the condenser lens 8105.

The cylindrical lens 8103 and the condenser lens 8105 provide the effect for changing the shape of a beam to be projected to the wavefront control element 8106. When the diameter of a beam projected to the wavefront control element in the wavelength demultiplexing direction is reduced, the passband for signal light can be extended. Further, when the size of the beam is enlarged in the port switching direction, the angle of emittance required for switching can be reduced.

(Port Switching)

When the light is emitted from the port 8101*a*-1 of the first input/output port array 8101*a*, the light is transmitted through the corresponding microlens 8102*a*-1 of the first microlens array 8102*a*, the cylindrical lens 8103, the dispersive element 8104 and the condenser lens 8105, and is projected to the reflective wavefront control element 8106. The light projected to the wavefront control element 8106 is reflected to change the emittance angle through the wavefront control, and the reflected light is transmitted again through the condenser lens 8105, the dispersive element 8104 and the cylindrical lens 8103 and through the microlens 8102*a*-2 of the first microlens array 8102*a*, and is coupled at the port 8101*a*-2 of the first input/output port array 8101*a*. When the wavefront control element 8106 is appropriately controlled, the direction of the reflected light can be changed, and the reflected light can also be coupled at another port 8101*a*-3. The cylindrical lens 8103 and the condenser lens 8105 have a function that crosses, at a point 8107*a* on a face other than that of the wavefront control element, light rays having arbitrary angles that intersect at an identical point 8108*a* on the wavefront control element, and the input/output port array 8101*a* of the same wavelength selective switch is located on the arc with the point 8107*a* being the center. The point 8101*a* may also be provided as a virtual point located on the line of extension of the principal ray. Since the optical system is designed so that the principal rays of a beam that enter or exit, according to wavelengths, the same input/output port array, i.e., the first input/output port array 8101*a*, intersect at the identical point 8106*a* on the wavefront control element 8106, high coupling efficiency can be obtained.

The similar port switching operation is performed for the second input/output port array 8101*b*. Specifically, light emitted from the port 8101*b*-1 of the second input/output port array 8101*b* is transmitted through the corresponding microlens 8102*b*-1 of the second microlens array 8102*b*, the cylindrical lens 8103, the dispersive element 8104 and the condenser lens 8105, and is projected to the wavefront control element 8106. The light projected to the wavefront control element 8106 is reflected to change the angle of emittance through wavefront control, and the reflected light is transmitted again through the condenser lens 8105, the dispersive element 8104 and the cylindrical lens 8103 and through the microlens 8102*b*-2 of the second microlens array 8102*b*, and is coupled at the port 8101*b*-2 of the second input/output port array 8101*b*. When the wavefront control element 8106 is appropriately controlled, the direction of the reflected light can be changed, and can also be coupled at another port 8101*b*-3. As well as the case of the first input/output port array 8101*a*, the optical system is designed so that the principal rays of a beam that enter or exit, according to wavelength, the same input/output port array, i.e., the second input/output port array 8101*b*, intersect at the identical point 8108*b* on the wavefront control element 8106, and also intersect at the identical point 8107*b* on a face outside the wavefront control element.

In this embodiment, the fibers connected to the first input/output port array 8101*a* are arranged on the arc with the point 8107*a* being the center, while the fibers connected to the second input/output port array 8101*b* are arranged on the arc with the point 8107*b* being the center, and the focal point 8107*a* and the focal point 8107*b* are arranged at different locations. With this arrangement, as for coupling of the beams at the ports that belong to the same switch group to be connected, the coupling efficiency can be selectively improved by designing the arrangement to obtain overlap between the beams and to align the phases of the beams. As for coupling of the beams at the ports that belong to different switch groups, the occurrence of crosstalk can be reduced by designing the arrangement not to obtain overlap between the beams.

Further, in this embodiment, when the input/output port arrays and the microlens arrays are provided by being integrated on a planer lightwave circuit by using the photolithography technology, the accurate arrangement consonant with high mask overlay accuracy can be implemented.

According to this optical system, since the focal points of the principal rays are changed depending on the individual wavelength selective switches of the input/output port arrays 8101, and since the ports are arranged along the arc with the focal point 8107 being the center, and the point 8107 is projected to the wavefront control element 8106 by the condenser lens, a plurality of groups of switches can be provided with a simple structure. Further, a plurality of wavelength selective switches can be obtained by additionally providing the dispersive element 8104. Furthermore, since the ports can be fabricated by using a planar lightwave circuit, a mounting error can be reduced, and the additional function can easily be mounted.

[Fifth Embodiment]

Figure 9A:
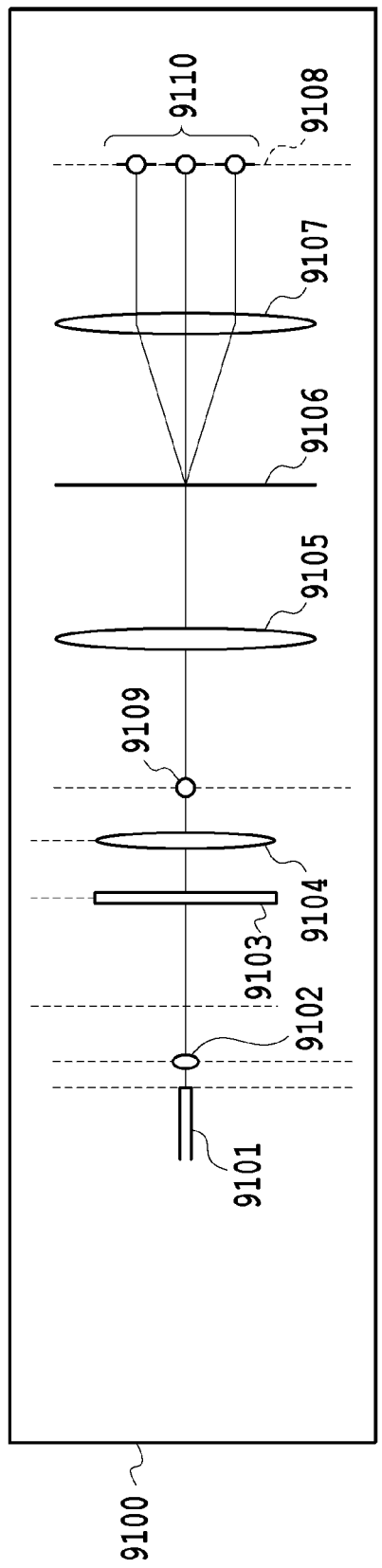
FIG. 9A A diagram illustrating a fifth embodiment for the wavelength selective switch according to the present invention.
Figure 9B:
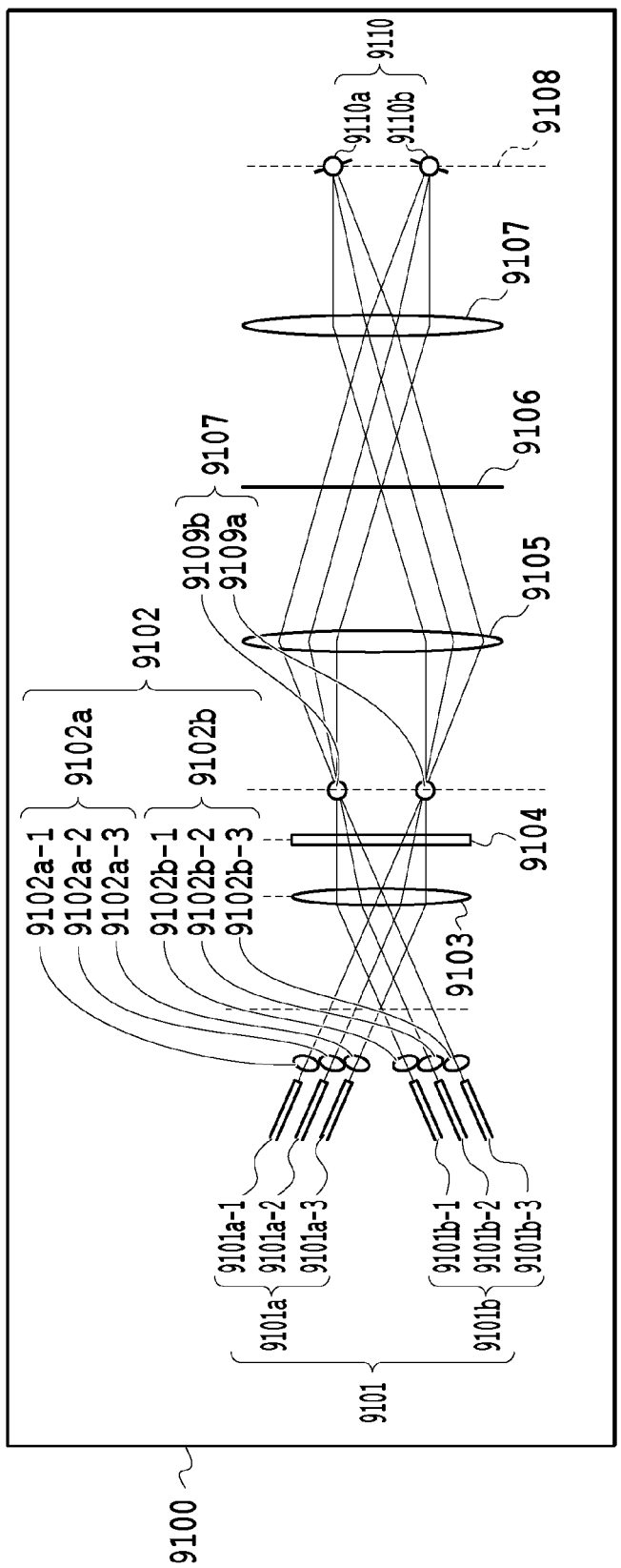
FIG. 9B A diagram illustrating the fifth embodiment for the wavelength selective switch according to the present invention.

A wavelength selective switch array 9100 for a fifth embodiment is shown in FIGS. 9A and 9B. Referring to FIGS. 9A and 9B, the arrangement includes input/output port arrays 9101, microlens arrays 9102, a cylindrical lens 9103, a cylindrical lens 9104, a condenser lens 9105, a dispersive element 9106, a condenser lens 9107 and a reflective wavefront control element 9108. A plurality of input/output ports are arranged for the individual wavelength selective switches, and in this embodiment, three input and output ports are provided in each switch.

A direction in which the ports are aligned is defined as a port direction. FIG. 9A is a cross-sectional view taken in a wavelength dispersion direction that is perpendicular to the port direction, and FIG. 9B is a cross-sectional view taken in the port direction.

(Components of Optical System)

The input/output port arrays 9101 are identical to the input/output port arrays 4101 shown in FIGS. 4A and 4B for the first embodiment, and the microlens arrays 9102 are identical to the microlens arrays 4102, except for the arrangement method employed. Further, the reflective wavefront control element 9108 is identical to the reflective wavefront control element 4105.

The dispersive element 9106 demultiplexes, by wavelengths, the light emitted through the cylindrical lenses 9103 and 9104 and the condenser lens 9105 from the individual input ports 9101a-1 and 9101b-1 of the input/output port arrays 9101, and projects the demultiplexed light to the wavefront control element 9108 through the condenser lens 9107.

The cylindrical lens 9103 and the cylindrical lens 9104 provide the effect for changing the shape of a beam to be projected at an intersection point 9109. The size or shape of the beam on the plane at the intersection point 9109 is projected to the wavefront control element 9108 by the condenser lens 9106 and the condenser lens 9107. When the diameter of a beam projected to the wavefront control element in the wavelength demultiplexing direction is reduced, the passband for signal light can be extended. Further, when the size of the beam is enlarged in the port switching direction, the angle of emittance required for switching can be reduced.

(Port Switching)

When the light is emitted from the port 9101a-1 of the first input/output port array 9101a, the light is transmitted through the corresponding microlens 9102a-1 of the first microlens array 9102a, the cylindrical lens 9103, the cylindrical lens 9104, the condenser lens 9105, the dispersive element 9106 and the condenser lens 9107, and is projected to the reflective wavefront control element 9108. The light projected to the wavefront control element 9108 is reflected to change the emittance angle through the wavefront control, and the reflected light is transmitted again through the condenser lens 9107, the dispersive element 9106, the condenser lens 9105, the cylindrical lens 9104 and the cylindrical lens 9103 and through the microlens 9102a-2 of the first microlens array 9102a, and is coupled at the port 9101a-2 of the first input/output port array 9101a. When the wavefront control element 9108 is appropriately controlled, the direction of the reflected light can be changed, and the reflected light can also be coupled at another port 9101a-3. The condenser lens 9105 and the condenser lens 9107 have a function that crosses, at a point 9109a on a face other than that of the wavefront control element, light rays having arbitrary angles that intersect at an identical point 9110a on the wavefront control element. The cylindrical lens 9103 has a function that changes, to parallel light rays, the light rays of arbitrary angles that intersect at the point 9109a on the face outside the wavefront control element, and the input/output ports 9102a are located in parallel to each other. Since the optical system is designed so that the principal rays of a beam that enter or exit, according to wavelengths, the same input/output port array, i.e., the second input/output port array 9101a, intersect at the identical point 9110a on the wavefront control element 9108, high coupling efficiency can be obtained.

The similar port switching operation is performed for the second input/output port array 9101b. Specifically, light emitted from the port 9101b-1 of the second input/output port array 9101b is transmitted through the corresponding microlens 9102b-1 of the second microlens array 9102b, the cylindrical lens 9103, the cylindrical lens 9104, the condenser lens 9105, the dispersive element 9106 and the condenser lens 9107, and is projected to the wavefront control element 9108. The light projected to the wavefront control element 9108 is reflected to change the angle of emittance through wavefront control, and the reflected light is transmitted again through the condenser lens 9107, the dispersive element 9106, the condenser lens 9105, the cylindrical lens 9104 and the cylindrical lens 9103 and through the microlens 9102b-2 of the second microlens array 9102b, and is coupled at the port 9101b-2 of the second input/output port array 9101b. When the wavefront control element 9106 is appropriately controlled, the direction of the reflected light can be changed, and can also be coupled at another port 9101b-3. As well as the case of the first input/output port array 9101a, the optical system is designed so that the principal rays of a beam that enter or exit, according to wavelength, the same input/output port array, i.e., the second input/output port array 9101b, intersect at the identical point 9110b on the wavefront control element 9108, and also intersect at the identical point 9109b on a face outside the wavefront control element.

In this embodiment, the fibers connected to the first input/output port array 9101a are arranged in parallel to each other, and the fibers connected to the second input/output port array 9101b are arranged also in parallel to each other; however, the angle for arranging the fibers differs between the first input/output port array 9101a and the second input/output port array 9101b. Since the principal rays having different angles are focused on different positions by the cylindrical lens 9103, the focal point 9109a and the focal point 9109b are provided at different locations, and the focal point 9107a and the focal point 9107b are provided also at different locations. With this arrangement, as for coupling of the beams at the ports that belong to the same wavelength selective switch to be connected, the coupling efficiency can be selectively improved by designing the arrangement to obtain overlap between the beams and to align the phases of the beams. As for coupling of the beams at the ports that belong to different wavelength selective switches, the occurrence of crosstalk can be reduced by designing the arrangement not to obtain overlap between the beams.

Further, in this embodiment, when the input/output port arrays and the microlens arrays are provided by being integrated on a planer lightwave circuit by using the photolithography technology, the accurate arrangement consonant with high mask overlay accuracy can be obtained.

According to this optical system, since the location of the focal point 9109 provided by the cylindrical lens 9103 is changed to change the angles of emittance for the principal rays depending on the individual wavelength selective switches of the input/output port arrays 9101, and the point 9109 is projected to the wavefront control element 9108 by the condenser lenses 9105 and 9107, a plurality of groups of switches can be provided with a simple structure. Further, a plurality of wavelength selective switches can be obtained by additionally providing the dispersive element 9106. Furthermore, since the ports can be fabricated by using a planar lightwave circuit, a mounting error can be reduced, and the additional function can easily be mounted.

[Sixth Embodiment]

Figure 10A:
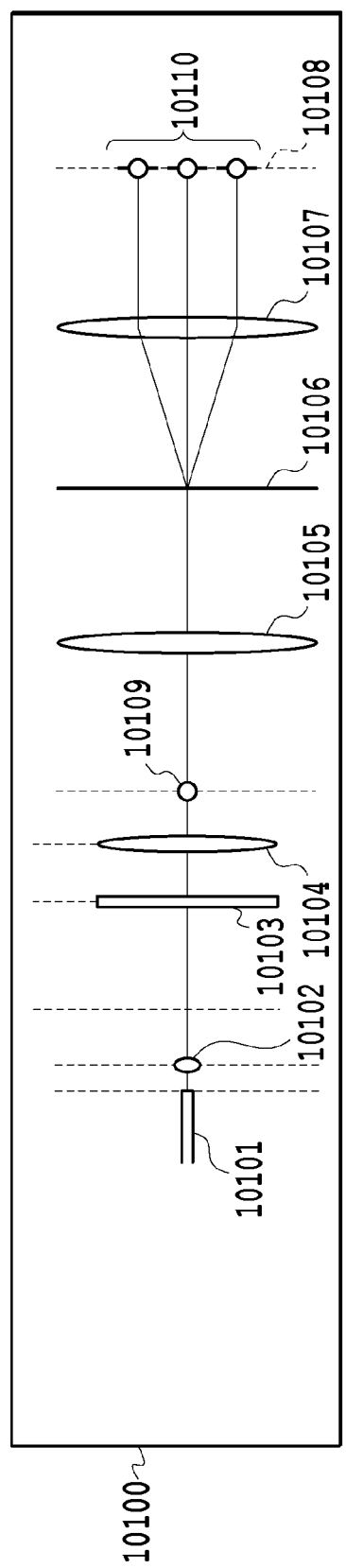
FIG. 10A A diagram illustrating a sixth embodiment for the wavelength selective switch according to the present invention.
Figure 10B:
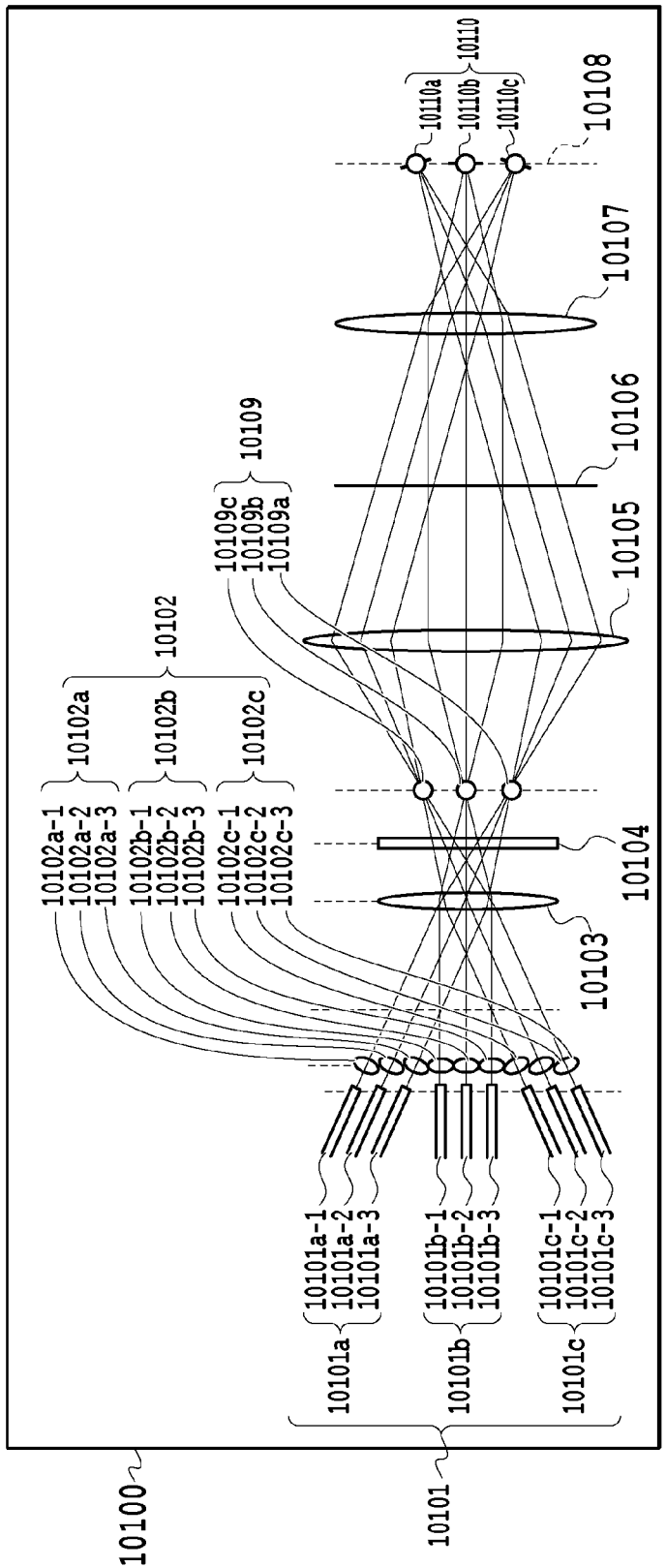
FIG. 10B A diagram illustrating the sixth embodiment for the wavelength selective switch according to the present invention.

A wavelength selective switch array 10100 for a sixth embodiment is shown in FIGS. 10A and 10B. Referring to FIGS. 10A and 10B, the arrangement includes input/output port arrays 10101, microlens arrays 10102, a cylindrical lens 10103, and a cylindrical lens 10104, a condenser lens 10105, a dispersive element 10106, a condenser lens 10107 and a reflective wavefront control element 10108.

A direction in which the ports are aligned is defined as a port direction. FIG. 10A is a cross-sectional view taken in a wavelength dispersion direction that is perpendicular to the port direction, and FIG. 10B is a cross-sectional view taken in the port direction.

In the arrangement for 10100, three input/output port arrays are employed. In the description for the above described embodiments, the number of wavelength selective switches is two; however, the number of wavelength selective switches may be two or greater.

[Seventh Embodiment]

Figure 11:
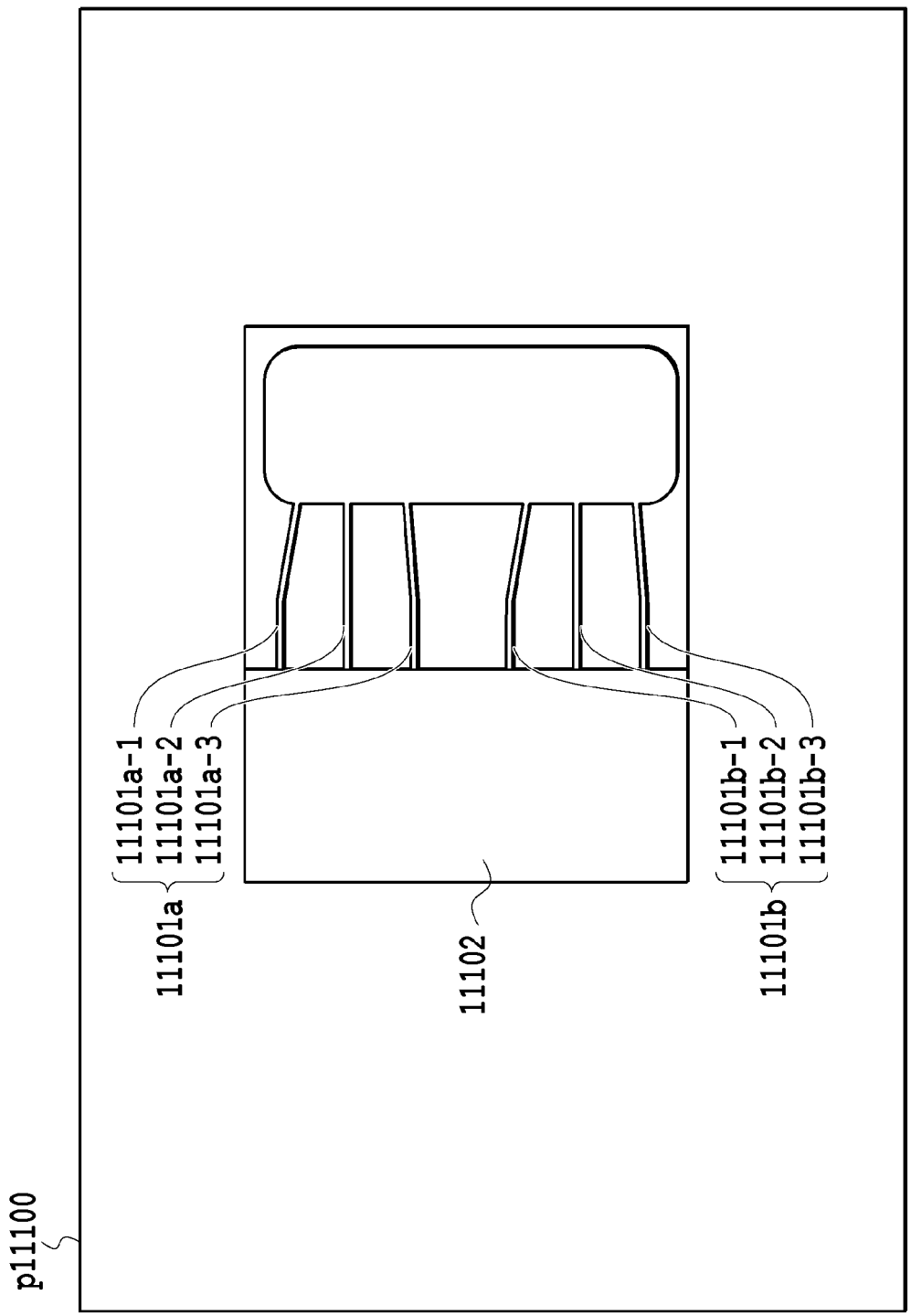
FIG. 11 A diagram illustrating a seventh embodiment for the wavelength selective switch according to the present invention.

An input and output port unit 11100 of a wavelength selective switch array for a seventh embodiment is shown in FIG. 11. The arrangement in FIG. 11 includes input/output port arrays 11101 and an optical function circuit 11102 that are produced by using a PLC. A first input/output port array 11101a corresponds to the input/output port array 4201a in FIGS. 4A and 4B, and a second input/output port array 11101b corresponds to the second input/output port array 4201b. The optical function circuit 11102 that is optically connected to the individual input and output ports of the input/output port arrays 11101 is provided by integrating functional elements, such as an optical splitter, an optical combiner, a switch, a light receiving element and a grating. Since the functional parts additionally provided for a ROADM can be incorporated for a WSS by integrating the functional elements to the input/output port arrays, reduction in the size of a node part can be expected. A specific function circuit for the optical function circuit 11102 will be described hereinafter in an eighth embodiment and the other embodiments.

[Eighth Embodiment]

Figure 12:
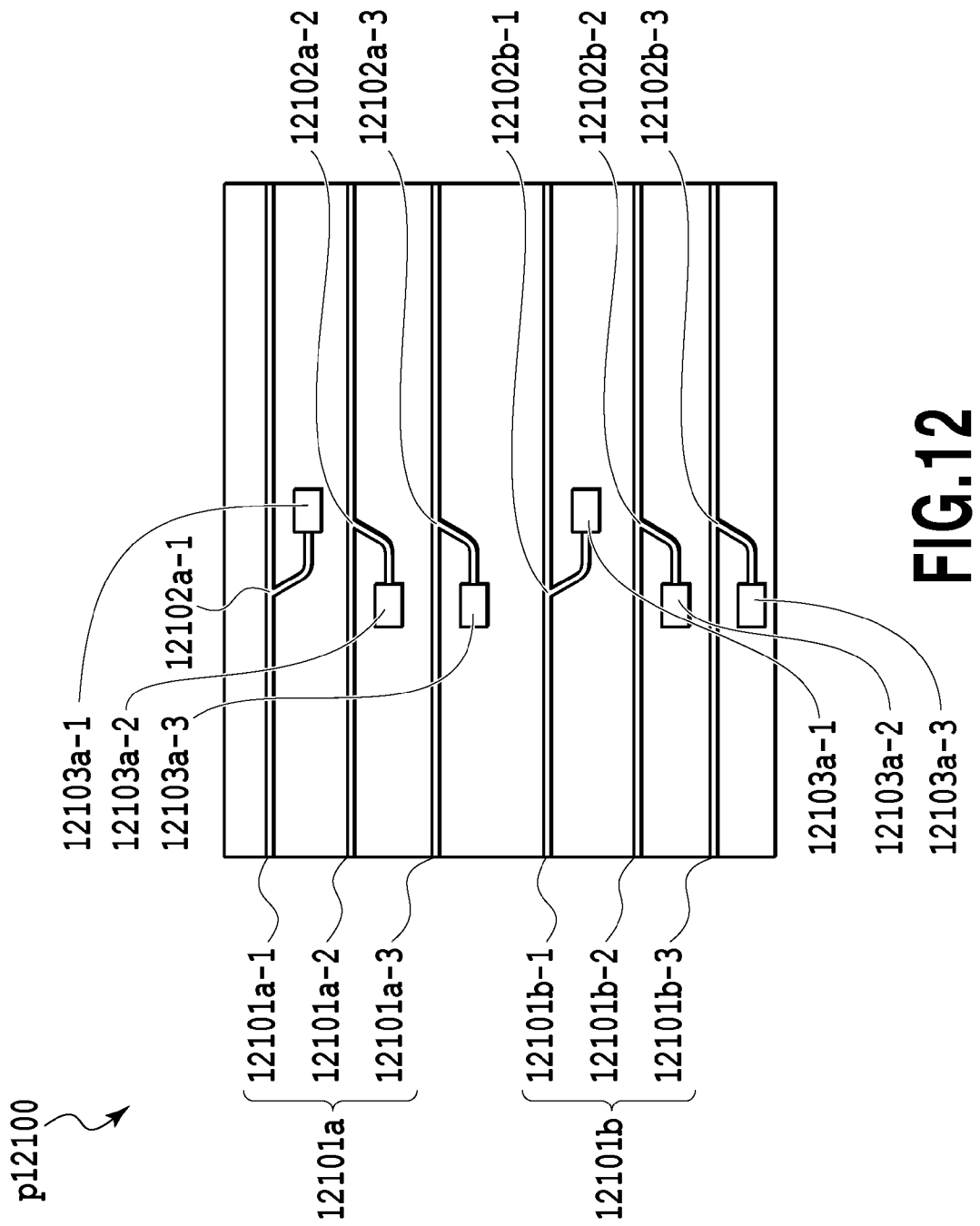
FIG. 12 A diagram illustrating an eighth embodiment for the wavelength selective switch according to the present invention.

An optical function circuit portion 12100 for the input/output ports of a wavelength selective switch array for an eighth embodiment is shown in FIG. 12. The arrangement in FIG. 12 includes optical waveguide arrays 12101a and 12101b, optical couplers 12102a-1 to 12102a-3 and 12102b-1 to 12102b-3 and photodiodes 12103a-1 to 12103a-3 and 12103b-1 to 12103b-3. This is an arrangement where an optical intensity monitor is mounted to the input and output ports. The input ports are ports 12101a-1 to 12101b-1, and light is separated respectively by the optical couplers 12102a-1 and 12102b-1 into light directed to the WSS and light directed to the photodiodes 12103a-1 and 12103b-1. Light emitted from the input port 12101a-1 toward the WSS is transmitted through the optical system and is returned to an output port 12101a-2 or 12101a-3. Optical couplers 12102a-2 and 12102a-3 are provided for the output ports, as well as the input ports, and the output light is separated into light directed to the photodiodes 12103a-2 and 12103a-3 and light to be output. As well as the light emitted at the port 12101a-1, the light emitted at the input port 12101b-1 is transmitted through the optical system, and is output from the output port 12101b-2 or 12101b-3. Since light that is separated by the optical couplers and directed to the photodiodes is received, measurement of the optical intensity can be performed. Through the measurement of the optical intensity, it can be determined whether light having the optical intensity as designated is emitted to the output port, and therefore, detection of a failure can be performed. When the function of the WSS failure detection monitor is integrated to the input/output portion of the WSS in this manner, a small optical part for a node that enables failure detection can be obtained.

In this embodiment, a Drop type WSS having a single input port has been described; however, the same effects can also be obtained for an Add type WSS having a plurality of input ports.

[Ninth Embodiment]

Figure 13:
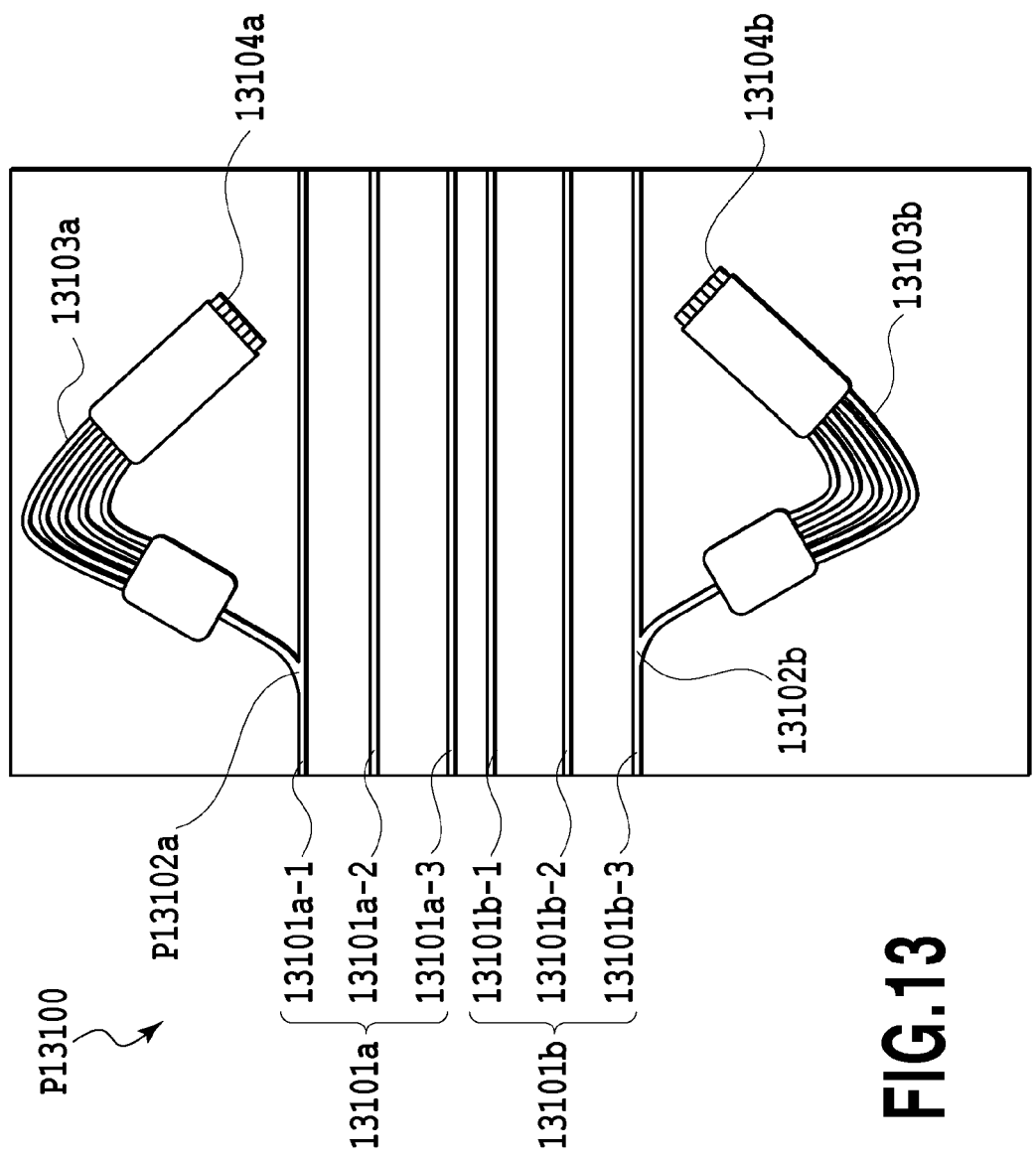
FIG. 13 A diagram illustrating a ninth embodiment for the wavelength selective switch according to the present invention.

An optical function circuit portion 13100 for the input/output ports of a wavelength selective switch array for a ninth embodiment is shown in FIG. 13. The arrangement in FIG. 13 includes optical waveguide arrays 13101a and 13101b, optical couplers 13102a and 13102b, AWGs (Arrayed Waveguide Gratings) 13103a and 13103b and photodiodes 13104a and 13104b. This is an arrangement where a wavelength monitor is mounted to the input ports. The input ports are ports 13101a-1 to 13101b-1, and light is separated by the optical couplers 13102a and 13102b, respectively into light directed to the WSS and light directed to the AWGs 13103a and 13103b. Light emitted from the input port 13101a-1 toward the WSS is transmitted through the optical system, and is returned to an output port 13101a-2 or 13101a-3. As well as the light emitted at the port 13101a-1, the light emitted at the input port 13101b-1 is transmitted through the optical system, and is output from the output port 13101b-2 or 13101b-3. Light separated by the optical couplers and directed to the AWGs is demultiplexed by wavelengths, and the wavelengths are received respectively by the photodiodes. Therefore, measurement of the optical intensity for the individual wavelengths can be performed. Through the measurement of the optical intensity for the individual wavelengths, the output values of the wavelengths can be controlled by the WSS. Furthermore, when a wavelength monitor having the same structure is additionally provided for the output port side, a failure of the WSS can be detected for each wavelength. When the wavelength monitor is functionally integrated to the input/output portion of the WSS in this manner, a small optical part for a node that enables output control or failure detection can be obtained.

Also in this embodiment, a Drop type WSS having a single input port has been described; however, the same effects can also be obtained for an Add type WSS having a plurality of input ports.

[Tenth Embodiment]

Figure 14:
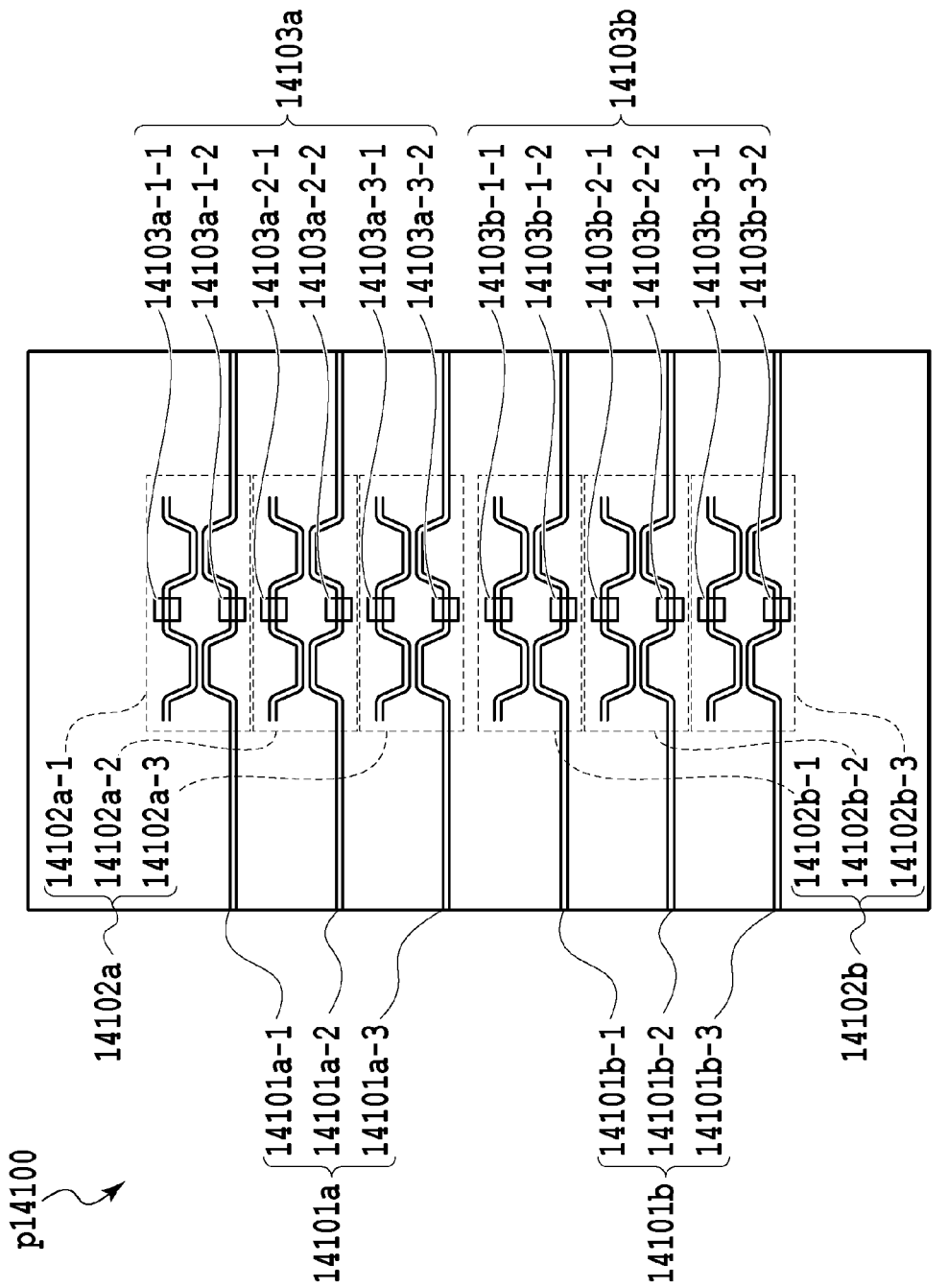
FIG. 14 A diagram illustrating a tenth embodiment for the wavelength selective switch according to the present invention.

An optical function circuit portion 14100 for the input/output ports of a wavelength selective switch array for a tenth embodiment is shown in FIG. 14. The arrangement in FIG. 14 includes optical waveguide arrays 14101a and 14101b and Mach-Zehnder interferometer arrays 14102a and 14102b, and phase shifter units 14103a and 14103b are attached to the Mach-Zehnder interferometer arrays 14102a and 14102b. This is the arrangement where a VOA (Variable Optical Attenuator) is mounted to input and output ports. The input ports are ports 14101a-1 and 14101b-1, and light is transmitted through the Mach-Zehnder interferometers toward the optical system. The light emitted at the input port 14101a-1 is transmitted through the optical system, and is thereafter returned to an output port 14101a-2 or 14101a-3. As well as the light emitted at the port 14101a-1, the light emitted at the input port 14101b-1 is transmitted through the optical system, and is output from an output port 14101b-2 or 14101b-3. The Mach-Zehnder interferometer 14102a-1 can change the intensity of light transmitted to the optical system by adjusting phase shifters 14103a-1-1 and 14103a-1-2. Likewise, the Mach-Zehnder interferometers 14102a-2, 14102a-3, 14102b-2 and 14102b-3 can change the intensity of passing light by adjusting the respective phase shifters 14103a-2-1 to 14103a-3-2 and 14103b-2-1 to 14103b-3-2. The optical intensities at the input and output ports can be collectively controlled by using the VOA function. Since the function of the VOA is integrated at the input/output portion of the WSS in this manner, a small optical part for a node that enables collective control for optical intensities can be obtained.

Also in this embodiment, a Drop type WSS having a single input port has been described; however, the same effects can also be obtained for an Add type WSS having a plurality of input ports.

[Eleventh Embodiment]

Figure 15:
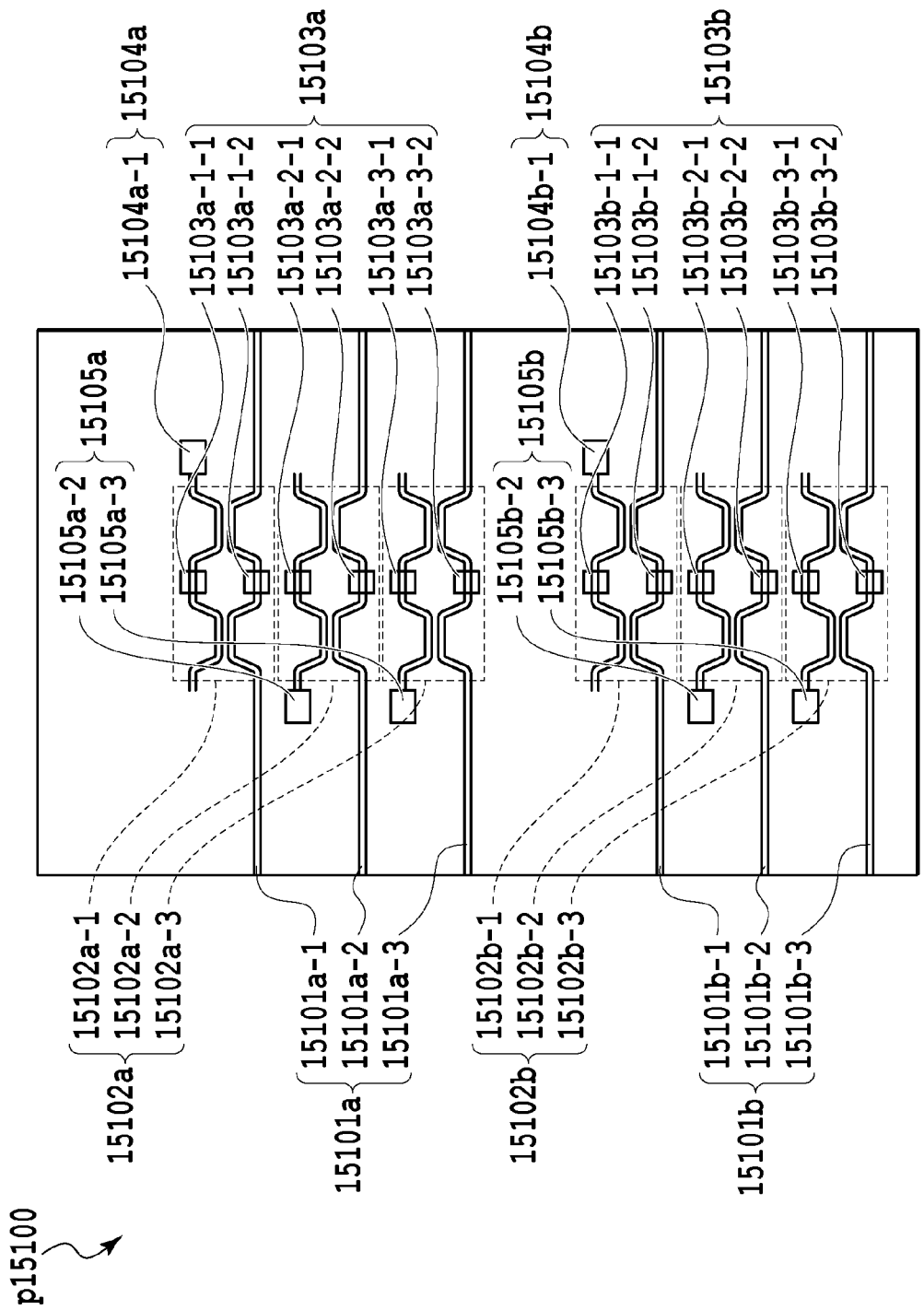
FIG. 15 A diagram illustrating an eleventh embodiment for the wavelength selective switch according to the present invention.

An optical function circuit portion 15100 for the input/output ports of a wavelength selective switch array for an eleventh embodiment is shown in FIG. 15. The arrangement in FIG. 15 includes optical waveguide arrays 15101a and 15101b and Mach-Zehnder interferometer arrays 15102a and 15102b and photodiodes 15104a, 15104b, 15105a and 15105b, and phase shifter units 15103a and 15103b are attached to the Mach-Zehnder interferometer arrays 15102a and 15102b. This is the arrangement where an optical switch and a power monitor are mounted to input and output ports. The input ports are ports 15101a-1 and 15101b-1, and light is transmitted through the Mach-Zehnder interferometers toward the optical system. The light emitted at the input port 15101a-1 is transmitted through the optical system, and is returned to an output port 15101a-2 or 15101a-3. As well as the light emitted at the port 15101a-1, the light emitted at the input port 15101b-1 is transmitted through the optical system, and is output from an output port 15101b-2 or 15101b-3.

The Mach-Zehnder interferometer 15102a-1 has an optical switching function that can adjust the phase shifters 15103a-1-1 and 15103a-1-2 to select a direction from the optical waveguide 15101a-1 to the photodiode 15104a-1 as a light traveling direction. Likewise, the Mach-Zehnder interferometers 15102a and 15102a can adjust the respective phase shifter units 15103a and 15103b to switch between light to be input or output to the ports and light directed to the monitor.

With this function, the optical intensity can be periodically monitored by the optical switch. Since the functions of the optical switch and the monitor are integrated at the input/output portion of the WSS in this manner, a small optical part for a node that can periodically monitor the optical intensity can be obtained.

Also in this embodiment, a Drop type WSS having a single input port has been described; however, the same effects can also be obtained for an Add type WSS having a plurality of input ports.

[Twelfth Embodiment]

Figure 16A:
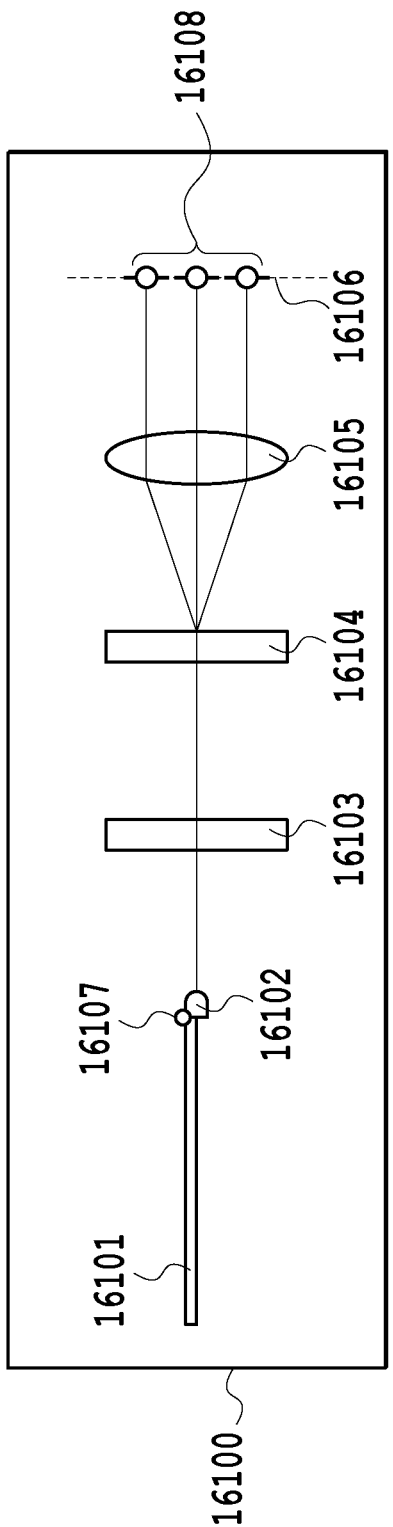
FIG. 16A A diagram illustrating a twelfth embodiment for the wavelength selective switch according to the present invention.
Figure 16B:
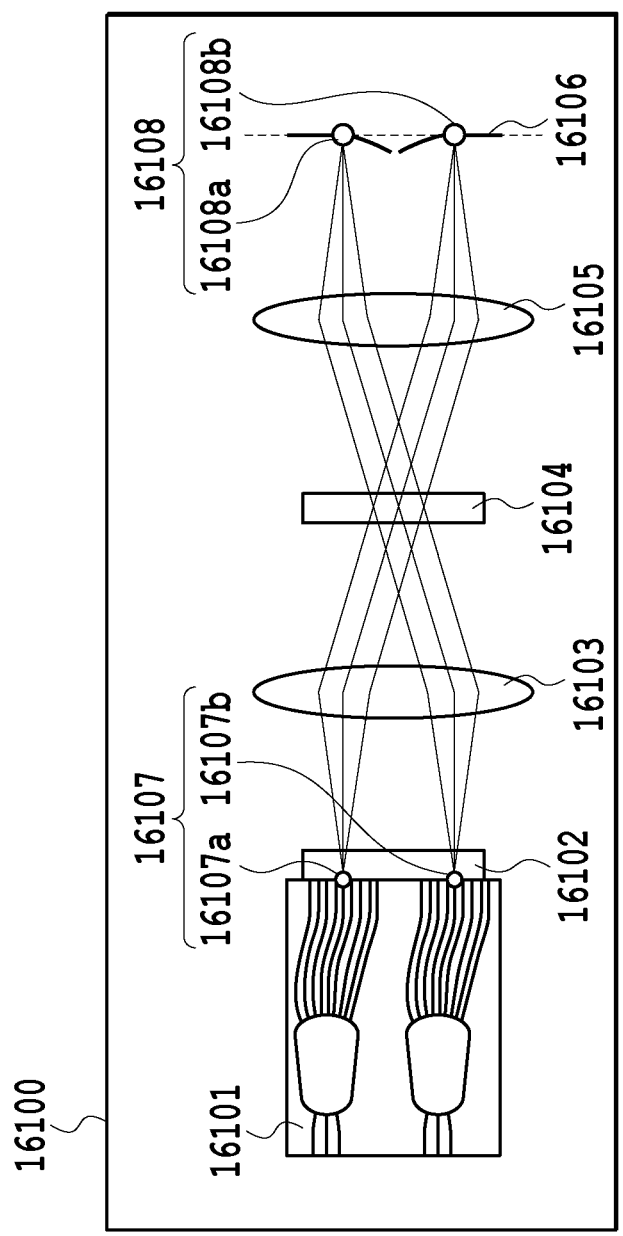
FIG. 16B A diagram illustrating the twelfth embodiment for the wavelength selective switch according to the present invention.
Figure 17:
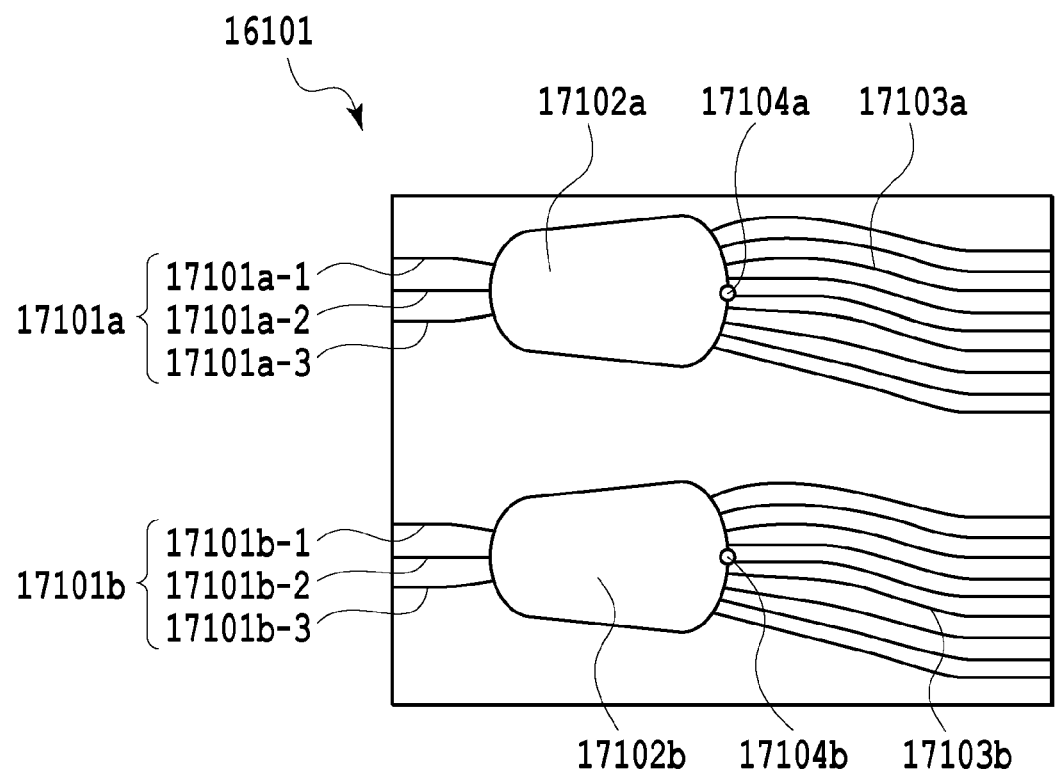
FIG. 17 A detailed diagram for the planar lightwave circuit of the wavelength selective switch shown in FIGS. 16A and 16B.

A wavelength selective switch array 16100 for a twelfth embodiment is shown in FIGS. 16A and 16B. Referring to FIGS. 16A and 16B, the arrangement includes a planar lightwave circuit 16101, a collimating cylindrical lens 16102, a cylindrical lens 16103, a dispersive element 16104, a condenser lens 16105 and a reflective wavefront control element 16106. The planar lightwave circuit 16101 is shown in detail in FIG. 17. Referring to FIG. 17, the arrangement includes optical waveguide arrays 17101a and 17101b, slab waveguides 17102a and 17102b and arrayed waveguides 17103a and 17103b. The arrayed waveguides 17103a and 17103b are designed, so that the lengths of all the arrayed waveguides are equal, and a phase difference will not occur between the individual waveguides consisting of each arrayed waveguide. The input ports are ports 17101a-1 and 17101b-1, and light is transmitted through the slab waveguides and the arrayed waveguides, and is directed to the optical system. In the individual switch groups, a plurality of light input and output ports are prepared, and in this embodiment, three light input and output ports are illustrated.

A direction in which the ports are aligned is defined as a port direction. FIG. 16A is a cross-sectional view taken in a wavelength dispersion direction that is perpendicular to the port direction, and FIG. 16B is a cross-sectional view taken in the port direction.

(Components of Optical System)

The same arrangement is employed, except in that the input/output port arrays 8101 for the fourth embodiment in FIGS. 8A and 8B and the microlens arrays 8102 are integrated to the planar lightwave circuit 16101. The reflective wavefront control element 16106 is identical to the reflective wavefront control element 8106.

The dispersive element 16104 demultiplexes, by wavelengths, the light emitted through the cylindrical lens 16103 from the individual input ports 17101a-1 and 17101b-1 of the input/output port arrays 16101, and projects the demultiplexed light to the wavefront control element 16106 through the condenser lens 16105.

The cylindrical lens 16103 and the condenser lens 16105 provide the effect for changing the shape of a beam to be projected to the wavefront control element 16106. When the diameter of a beam projected to the wavefront control element in the wavelength demultiplexing direction is reduced, the passband for signal light can be extended. Further, when the size of the beam is enlarged in the port switching direction, the angle of emittance required for switching can be reduced.

(Port Switching)

Light that is propagated through one port 17101a-1 of the first input/output port array 17101a is confined in the first slab waveguide 17102a in the direction of the thickness of a substrate, and the light in this state propagates while spreading in the port direction. The light is coupled at the arrayed waveguide 17103a. Since the arrayed waveguides are arranged with the same length, the light is transmitted to the terminal end of the arrayed waveguide 17103a while the phase information for the slab waveguide 17102a is maintained. Since the terminal end of the arrayed waveguide 17103a is connected to the end face of the planar lightwave circuit 16101, the phases of light rays emitted at the individual arrayed waveguides are aligned at the end face, and as a result, the light is emitted as a planar wave associated with the port direction. The emitted light is adjusted by the collimating cylindrical lens 16102 to collimated light associated with the wavelength demultiplexing axial direction, and this collimated light is transmitted through the cylindrical lens 16103, the dispersive element 16104 and the condenser lens 16105, and is projected to the wavefront control element 16106. The light projected to the wavefront control element 16106 is reflected to change the angle of emittance through wavefront control, and the reflected light is transmitted again through the condenser lens 16105, the dispersive element 16104, the cylindrical lens 16103 and the collimating cylindrical lens 16102, and thereafter through the first arrayed waveguide 17103a and the first slab waveguide 17102a. The light for which the angle of emittance has been changed by the wavefront control element is propagated through the first slab waveguide 17102a with being inclined in accordance with the inclination, and is coupled at the port 17101a-2 of the first input/output port array 17101a. When the wavefront control element 16106 is appropriately controlled, the direction of the reflected light can be changed, and the reflected light can be coupled also at another port 17101a-3. The cylindrical lens 16103 and the condenser lens 16105 have a function that crosses, at a point 16107a on a face other than that of the wavefront control element, light rays having arbitrary angles that intersect at an identical point 16108a on the wavefront control element, and the input and output ports of the input/output port array 17101a of the same group are located on the arc with the point 17104a being the center. The point 17104a may also be provided as a virtual point located on the line of extension of the principal ray. Since the optical system is designed, so that the principal rays of a beam that enter or exit the same input/output port array 17101a according to wavelengths intersect at the identical point 16108a on the wavefront control element 16106, high coupling efficiency can be obtained.

The similar port switching operation is performed for the second input/output port array 17101b. Since the same optical system as used for the fourth embodiment is employed for this embodiment, as for coupling of the beams at the ports that belong to the same wavelength selective switch to be connected, the coupling efficiency can be selectively improved by designing the arrangement to obtain overlap between the beams and to align the phases of the beams. As for coupling of the beams at the ports that belong to different wavelength selective switches, the occurrence of crosstalk can be reduced by designing the arrangement not to obtain overlap between the beams.

Further, in this embodiment, when the input/output port arrays and the microlens arrays are provided by being integrated on a planer lightwave circuit by using the photolithography technology, the accurate arrangement consonant with high mask overlay accuracy, the reduction of mounting error and easy provision of an additional function can also be implemented.

Furthermore, in this embodiment, the aspect ratio of beams can be freely changed. As previously described, it is necessary that for the wavelength selective switch, the diameter of the beam focused on the wavefront control element 16106 be increased in the port direction in order to increase the number of output ports. According to the arrangement of this embodiment, the beam diameter in the wavelength dispersion axial direction is determined in accordance with the relative refractive index and the thickness of a waveguide layer that is embedded, the adjustment of the aspect ratio can be performed by controlling the beam diameter in the port direction. At this time, a diameter $w_{port}$ of a beam emitted at the planar lightwave circuit 16101 in the port direction can be represented by the following expression.

$$w_y = \frac{\lambda f_{slab}}{\pi n_s w_{I/O}} \frac{d_1}{d_2} \qquad \text{[Expression 2]}$$

In expression 2, $\lambda$ represents the wavelength of signal light, $f_{slab}$ represents the length of a slab waveguide, and $w_{I/O}$ represents the diameter in the port direction of a beam entering the slab waveguide. According to expression 2, the beam diameter in the port direction can be increased in proportion to the length $f_{slab}$ of the slab waveguide.

The arrangement that includes a beam expander, an anamorphic prism pair, etc., is generally employed to adjust the aspect ratio of beams in a general special optical system. However, with this arrangement, the cost for newly added members and a workload for adjusting the alignment are increased. On this point, the arrangement of this embodiment where the anamorphic prism pair and the optical system for polarization diversity are integrated in the single planar lightwave circuit 16101 provides very great effects to reduce the cost required for members and the workload for adjusting the alignment.

The invention claimed is:

1. A wavelength selective switch array comprising:
   n wavelength selective switches, each of which includes:
   at least one input port adapted to accept light,
   at least one output port adapted to receive light from the input port,
   at least one condenser element adapted to change a shape of a beam of light received from the input port,
   at least one dispersive element adapted to disperse, for each wavelength, the light received from the input port, and
   at least one wavefront control element adapted to permit the light dispersed by the dispersive element for each wavelength to be reflected at the output port according to each wavelength,
   wherein at least the wavefront control element is employed in common by the n wavelength selective switches, and such that when a plurality of same wavelength lights are inputted in a plurality of the n wavelength selective switches, the plurality of same wavelength lights are condensed at respectively different positions on the wavefront control element for each of the n wavelength selective switches.

2. The wavelength selective switch array according to claim 1, wherein at least the condenser element is employed in common by the n wavelength selective switch.

3. The wavelength selective switch array according to claim 1, wherein, for the wavelength selective switches that belong to the same group, principal rays for individual wavelengths of light entering and exiting the input port and the output port intersect at one point on the wavefront control element, and for the wavelength selective switches that belong to different groups, do not intersect on the wavefront control element.

4. The wavelength selective switch array according to claim 3, wherein, for the wavelength selective switches that belong to the same group, the input port and the output port are arranged on an arc by employing, as the center, one point on the wavefront control element, and for the wavelength selective switches that belong to different groups, the input port and the output port are arranged on a different arc by employing, as the center, a different point on the wavefront control element.

5. The wavelength selective switch array according to claim 3, wherein angles of the principal rays entering and exiting the input port and the output port are varied among the wavelength selective switches that belong to different groups.

6. The wavelength selective switch array according to claim 5, wherein, for the wavelength selective switches that belong to the same group, the input port and the output port are arranged so that angles of incidence and angles of emittance of the principal rays are parallel to each other, and for the wavelength selective switches that belong to different groups, the input port and the output port are arranged so that the angles of incidence and the angles of emittance of the principal rays are not parallel.

7. The wavelength selective switch array according to claim 3, wherein, for the wavelength selective switches that belong to the same group, the principal rays for the individual wavelengths of light entering and exiting the input port and the output port intersect at one point located outside the wavefront control element, and the point located outside the wavefront control element is different for the wavelength selective switches that belong to different groups.

8. The wavelength selective switch array according to claim 7, wherein the input port and the output port are arranged so that, in the wavelength selective switches that belong to the same group, the angles of incidence and the angles of emittance of the principal rays are different.

9. The wavelength selective switch array according to claim 7, wherein, for the wavelength selective switches that belong to the same group, the input port and the output port are arranged, so that the angles of incidence and the angles of emittance of the principal rays are parallel, and the principal rays intersect at one point by at least one lens, and for the wavelength selective switches that belong to different groups, the input port and the output port are arranged, so that the angles of incidence and the angles of emittance for the principal rays are not parallel.

10. The wavelength selective switch array according to claim 1, wherein either set of the input port and the output port, or of the input port, the output port, and at least one of the condenser element, the dispersive element and the wavefront control element is produced by using a planar lightwave circuit.

11. The wavelength selective switch array according to claim 2, wherein, for the wavelength selective switches that belong to the same group, the principal rays for the individual wavelengths of light entering and exiting the input port and the output port intersect at one point on the wavefront control element, and for the wavelength selective switches that belong to different groups, do not intersect on the wavefront control element.

12. The wavelength selective switch array according to claim 4, wherein either set of the input port and the output port, or of the input port, the output port, and at least one of the condenser element, the dispersive element and the wavefront control element is produced by using a planar lightwave circuit.

13. The wavelength selective switch array according to claim 6, wherein either set of the input port and the output port, or of the input port, the output port, and at least one of the condenser element, the dispersive element and the wavefront control element is produced by using a planar lightwave circuit.

14. The wavelength selective switch array according to claim 8, wherein either set of the input port and the output port, or of the input port, the output port, and at least one of the condenser element, the dispersive element and the wavefront control element is produced by using a planar lightwave circuit.

15. The wavelength selective switch array according to claim 9, wherein either set of the input port and the output port, or of the input port, the output port, and at least one of the condenser element, the dispersive element and the wavefront control element is produced by using a planar lightwave circuit.

16. A wavelength selective switch array comprising:
a plurality of n wavelength selective switches, each wavelength selective switch comprising:
an input port adapted to receive light;
an output port adapted to output light;
a condenser element adapted to change a shape of a beam of light received from the input port;
a dispersive element adapted to disperse, for each wavelength, the light received from the input port; and
a wavefront control element adapted to selectively reflect a portion of the dispersed light to the output port, the portion corresponding to a wavelength of the light,
wherein all of the wavelength selective switches share between them at least the wavefront control element, and such that when a plurality of same wavelength lights are inputted in a plurality of the n wavelength selective switches, the plurality of same wavelength lights are condensed at respectively different positions on the wavefront control element for each of the n wavelength selective switches.

17. The wavelength selective switch array according to claim 16, wherein the input port and the output port are integrated on a planar lightwave circuit.

18. The wavelength selective switch array according to claim 17, wherein at least one of the condenser element, the dispersive element and the wavefront control element are integrated on the planar lightwave circuit.

19. The wavelength selective switch array according to claim 16, wherein for each wavelength selective switch:
the output port is a first output port and the wavelength selective switch comprises a plurality of output ports that includes the first output port, and
the waveform control element is controllable to reflect the portion of the dispersed light to any of the output ports.

20. The wavelength selective switch array according to claim 19, wherein for each wavelength selective switch, the waveform control element is rotatable such that rotation of the waveform control element determines to which of the output ports the portion of the dispersed light is reflected.

21. The wavelength selective switch array of claim 1, wherein light emitted from the n wavelength selective switches are not in parallel.

* * * * *